US008824614B2

(12) United States Patent
Tokairin

(10) Patent No.: US 8,824,614 B2
(45) Date of Patent: Sep. 2, 2014

(54) IMAGE PROCESSING APPARATUS, SIGNAL TRANSFER CIRCUIT, AND SEMICONDUCTOR INTEGRATED CIRCUIT

(75) Inventor: Motohiro Tokairin, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 181 days.

(21) Appl. No.: 13/600,627

(22) Filed: Aug. 31, 2012

(65) Prior Publication Data

US 2013/0222844 A1 Aug. 29, 2013

(30) Foreign Application Priority Data

Feb. 23, 2012 (JP) ................................ 2012-037925

(51) Int. Cl.
*H04L 7/00* (2006.01)

(52) U.S. Cl.
USPC ........................................................ 375/371

(58) Field of Classification Search
USPC ........................................................ 375/371
See application file for complete search history.

(56) References Cited

U.S. PATENT DOCUMENTS

2001/0024518 A1* 9/2001 Yaguchi ........................ 382/170
2003/0107659 A1* 6/2003 Takahashi et al. ......... 348/222.1
2011/0228105 A1* 9/2011 Ito ............................. 348/207.1
2013/0342739 A1* 12/2013 Yanowitz et al. ............ 348/246

FOREIGN PATENT DOCUMENTS

JP 05-110550 A 4/1993
JP 11-136312 A 5/1999

* cited by examiner

*Primary Examiner* — Don N Vo
(74) *Attorney, Agent, or Firm* — Sughrue Mion, PLLC

(57) ABSTRACT

An image processing apparatus includes first and second transfer circuits. The first transfer circuit transfers a first image processing signal in accordance with a first reference signal. The second transfer circuit transfers a second image processing signal, which is extracted from the first image processing signal in accordance with a second reference signal. The first transfer circuit includes a transmission circuit that transmits an adjusting signal to the second transfer circuit in accordance with the first reference signal. The second transfer circuit includes first and second adjusting circuits. The first adjusting circuit adjusts a phase of the adjusting signal so that the second image processing signal will be stably extracted from the adjusting signal in accordance with the second reference signal. The second adjusting circuit adjusts the phase of the adjusting signal so that the second image processing signal extracted from the adjusting signal will match the adjusting signal.

20 Claims, 17 Drawing Sheets

IMAGE PROCESSING APPARATUS, SIGNAL TRANSFER CIRCUIT, AND SEMICONDUCTOR INTEGRATED CIRCUIT

CROSS-REFERENCE TO RELATED APPLICATIONS

This application is based on and claims priority under 35 USC 119 from Japanese Patent Application No. 2012-037925 filed Feb. 23, 2012.

BACKGROUND

Technical Field

The present invention relates to an image processing apparatus, a signal transfer circuit, and a semiconductor integrated circuit.

SUMMARY

According to an aspect of the invention, there is provided an image processing apparatus including: a first transfer circuit that is disposed subsequent to a first image processing circuit and that transfers a first image processing signal in accordance with a first reference signal, the first image processing signal being a parallel signal output from the first image processing circuit, the first image processing circuit performing first image processing in accordance with the first reference signal; and a second transfer circuit that is disposed prior to a second image processing circuit and that transfers a second image processing signal to the second image processing circuit, the second image processing signal being a parallel signal extracted from the first image processing signal output from the first transfer circuit in accordance with a second reference signal, the second reference signal being separated from the first reference signal, the second image processing circuit performing second image processing in accordance with the second reference signal. The first transfer circuit includes a transmission circuit that transmits, instead of the first image processing signal output from the first image processing circuit, an adjusting signal to the second transfer circuit in accordance with the first reference signal, the adjusting signal being a parallel signal for adjusting a phase shift of the first image processing signal. The second transfer circuit includes a first adjusting circuit that adjusts a phase of the adjusting signal transmitted from the transmission circuit so that the second image processing signal will be stably extracted from the adjusting signal in accordance with the second reference signal, and a second adjusting circuit that adjusts the phase of the adjusting signal transmitted from the transmission circuit so that the second image processing signal extracted from a signal obtained as a result of adjusting the phase of the adjusting signal by using the first adjusting circuit will match the adjusting signal transmitted from the transmission circuit.

BRIEF DESCRIPTION OF THE DRAWINGS

Exemplary embodiments of the present invention will be described in detail based on the following figures, wherein.

DETAILED DESCRIPTION

Figure 1:
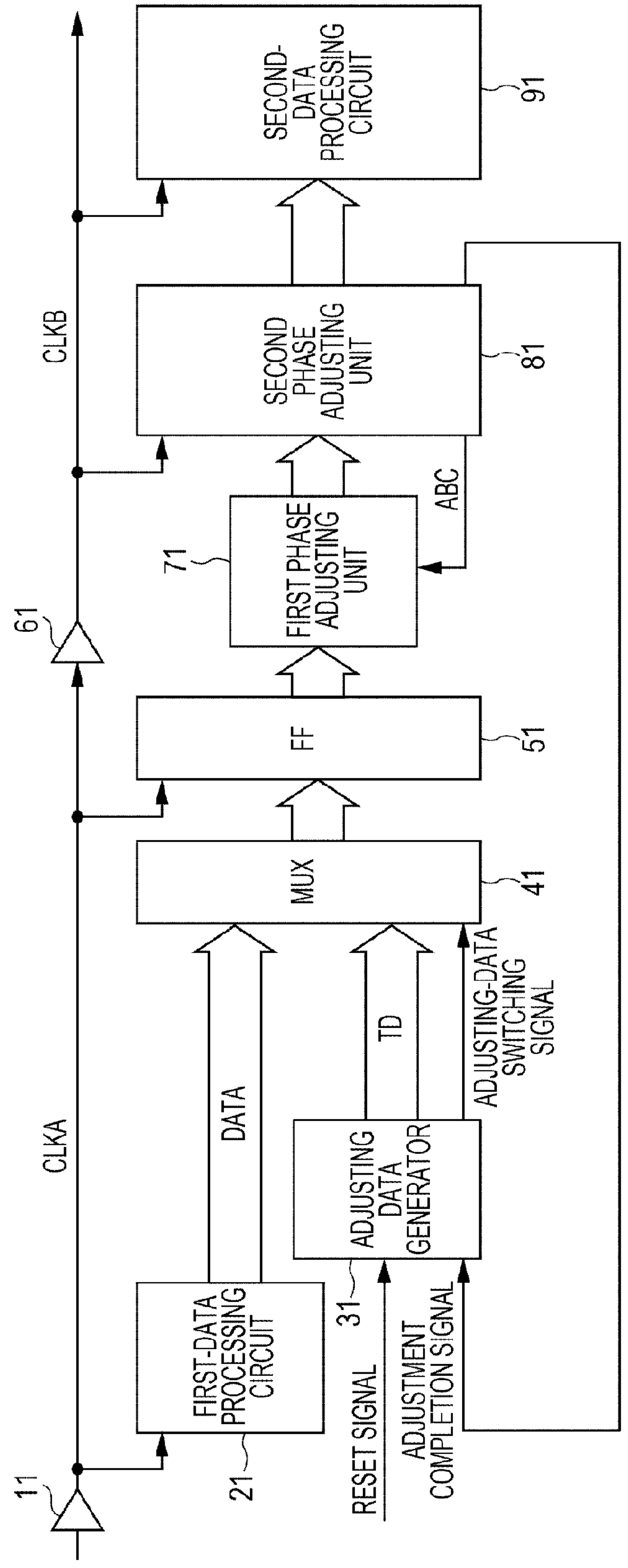
FIG. 1 is a block diagram illustrating an example of the configuration of a data processing circuit according to a first exemplary embodiment.

Exemplary embodiments of the present invention will be described below in detail with reference to the accompanying drawings.

Overview of Exemplary Embodiments

When performing, for example, fast printing in a printing apparatus, it is also necessary to increase the speed at which print data is processed. This also makes it necessary to increase the speed of a circuit that processes data. In order to satisfy such requirements, the circuit is constituted by using, for example, an application specific integrated circuit (ASIC), or a field programmable gate array (FPGA). However, an increased frequency of a reference signal in the circuit may sometimes make the circuit unable to operate with the same reference signal.

In order to cope with an increased frequency of a reference signal, generally, the following adjustment is performed. The arrangement of circuit components and the route of lines for a reference signal and a data signal within a semiconductor integrated circuit are adjusted so that the data signal can be transmitted while maintaining a correct relationship between the reference signal and the data signal. However, if the scale of a circuit operating with a high-frequency reference signal is increased, a setup time or a hold time in a subsequent circuit is not secured due to a total delay of the reference signal and the data signal, thereby failing to correctly transmit data in synchronization with the reference signal.

In an exemplary embodiment of the invention, therefore, circuit components within a semiconductor integrated circuit are divided into plural blocks, and a reference signal is also divided in accordance with the divided blocks, thereby reducing the occurrence of skew in the reference signal within each of the divided blocks. Additionally, a delay or skew of a reference signal and a data signal is adjusted so that parallel data received by a block disposed at a second stage will match parallel data, which is used for adjusting the phase of a signal, output from a block disposed at a first stage. With this arrangement, the scale of a circuit operating with a high-frequency reference signal can be increased.

The above-described arrangement will be discussed below more specifically through illustration of first through third exemplary embodiments.

First Exemplary Embodiment

In the first exemplary embodiment, circuit components within a semiconductor integrated circuit are divided into plural blocks, and each of the divided blocks is synchronized with the same reference signal. It is now assumed that the plural blocks are constituted by a first block and a second block and that the second block is disposed subsequent to the first block. At a data connecting portion for connecting the first block and the second block, a switching unit for switching between normal parallel data (hereinafter referred to as "normal data") and parallel data used for adjusting the phase (hereinafter referred to as "adjusting data") is provided at an input section of a flip-flop disposed at the output stage of the first block. The normal data represents the result of data processing performed by the first block. Additionally, the second block is provided with a first adjusting unit for detecting a phase shift of parallel data input from the first block (hereinafter also referred to as "input data") with reference to a reference signal and for adjusting the phase of the input data in accordance with the detected phase shift. The second block is also provided with a second adjusting unit for performing adjustment so that parallel data received as a result of performing data processing (hereinafter referred to as "received data") by the second block will match the adjusting data output from the first block.

FIG. 1 is a block diagram illustrating an example of the configuration of a data processing circuit according to the first exemplary embodiment.

The data processing circuit is constituted by a first block and a second block, which is disposed subsequent to the first block. The first block is synchronized with a reference signal CLKA, which is an example of a first reference signal, delayed in a delay circuit 11. The second block is synchronized with a reference signal CLKB, which is an example of a second reference signal, separated from the reference signal CLKA in a delay circuit 61. As shown in FIG. 1, the data processing circuit includes, as the first block, a first-data processing circuit 21, an adjusting data generator 31, a multiplexer (MUX) 41, and a flip-flop (FF) 51. The data processing circuit includes, as the second block, a first phase adjusting unit 71, a second phase adjusting unit 81, and a second-data processing circuit 91.

The first-data processing circuit 21 performs data processing of a first stage and outputs normal data (DATA), which indicates data processing results, to the MUX 41. In this exemplary embodiment, the first-data processing circuit 21 is an example of a first processing circuit.

In response to the input of a reset signal, the adjusting data generator 31 generates adjusting data (TD) for adjusting the phase of normal data to be transmitted from the first block to the second block, and then outputs the adjusting data to the MUX 41. Also, in response to the input of an adjustment completion signal indicating the completion of adjustment of the phase of the adjusting data from the second phase adjusting unit 81, the adjusting data generator 31 outputs an adjusting-data switching signal to the MUX 41.

In response to the input of an adjusting-data switching signal from the adjusting data generator 31, the MUX 14 switches parallel data to be output to the FF 51 from adjusting data output from the adjusting data generator 31 to normal data output from the first-data processing circuit 21. That is, the MUX 41 serves as the above-described switching unit. For example, when the data processing circuit is powered ON or is restarted (reset), the MUX 41 sets adjusting data as parallel data to be output from the FF 51, and then, upon receiving an adjusting-data switching signal from the adjusting data generator 31, the MUX 41 switches parallel data to be output from the FF 51 from the adjusting data to normal data. In this case, information indicating that parallel data to be output from the FF 51 has been switched from adjusting data to normal data may be output to an external source or may be stored in a storage device (e.g., a register) that is readable from an external source. The external source may be a source disposed in the outside of the data processing circuit or may be a source disposed in the outside of a device including the data processing circuit. In the first exemplary embodiment, adjusting data is used as an example of an adjusting signal, and normal data is used as an example of an output signal. As an example of the switching circuit, the MUX 41 is provided.

The FF 51 outputs normal data or adjusting data received from the MUX 41 to the second block in synchronization with the reference signal CLKA. That is, the FF 51 serves as a flip-flop disposed at the output stage of the first block. In the first exemplary embodiment, the FF 51 is provided as an example of a transmission circuit.

The first phase adjusting unit 71 adjusts the phase of input data input from the FF 51 on the basis of a selection signals ABC (discussed below).

The second phase adjusting unit 81 outputs the selection signals ABC to the first phase adjusting unit 71. The selection signals ABC are signals for adjusting the phase of input data received from the FF 51 so that received data can be stably extracted from the input data in synchronization with the reference signal CLKB. The second phase adjusting unit 81 readjusts the phase of the input data received from the FF 51 so that the received data extracted from data obtained as a result of adjusting the phase of the input data will match the adjusting data output from the FF 51. That is, the second phase adjusting unit 81 serves as the first adjusting unit for adjusting the phase and the second adjusting unit for performing adjustment so that the received data will match adjusting data. Then, upon completing the adjustment of the phase of the input data, the second phase adjusting unit 81 outputs an adjustment completion signal to the adjusting data generator 31. Alternatively, the adjustment completion signal may be output to an external source or may be stored in a storage device (e.g., a register) that is readable from an external source. In this case, the external source may be a source disposed in the outside of the data processing circuit or may be a source disposed in the outside of a device including the data processing circuit. The second phase adjusting unit 81 stores selection signals ABC which are used when input data received from the FF 51 is adjusting data, and after switching from adjusting data to normal data, the second phase adjusting unit 81 outputs the selection signals ABC to the first phase adjusting unit 71 and outputs received data extracted from the input data to the second-data processing circuit 91.

The second-data processing circuit 91 performs data processing of a second stage by using the received data. In the first exemplary embodiment, as an example of a received signal, received data is used. As an example of a second processing circuit, the second-data processing circuit 91 is provided.

The internal configuration of the first and second phase adjusting units 71 and 81 will be discussed below in a greater detail. A description will be given below, assuming that normal data, adjusting data, input data, and received data are all 32-bit parallel data.

Figure 2:
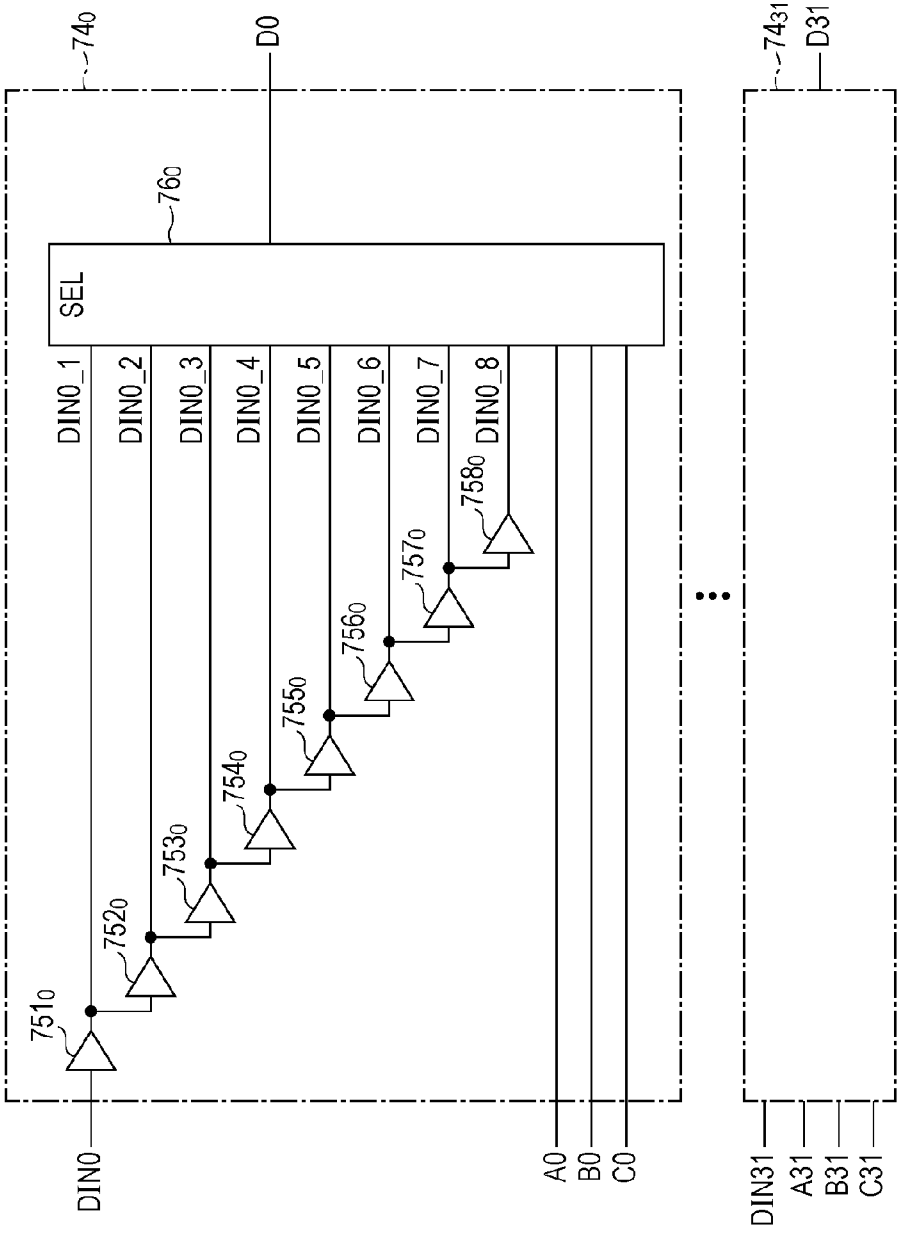
FIG. 2 is a block diagram illustrating an example of the internal configuration of a first phase adjusting unit.

FIG. 2 is a block diagram illustrating an example of the internal configuration of the first phase adjusting unit 71.

In the first through third exemplary embodiments, since 32-bit parallel data is handled, the first phase adjusting unit 71 includes, as shown in FIG. 2, bit phase adjusting sections $\mathbf{74}_0$, $\mathbf{74}_1$, . . . , $\mathbf{74}_{31}$.

The bit phase adjusting section $\mathbf{74}_0$ includes delay circuits $\mathbf{751}_0$, $\mathbf{752}_0$, . . . , $\mathbf{758}_0$ and a selector $\mathbf{76}_0$.

The delay circuit $\mathbf{751}_0$ delays the 0-th bit DIN0 of input data received from the FF 51 and sets the delayed data as DIN0_1, and the delay circuit $\mathbf{752}_0$ further delays DIN0_1, which has been delayed in the delay circuit $\mathbf{751}_0$, and sets the delayed data as DIN0_2. Thereafter, the delay circuits $\mathbf{753}_0$ through $\mathbf{757}_0$ sequentially delay the input data, and the delay circuit $\mathbf{758}_0$ further delays DIN0_7, which has been delayed in the delay circuit $\mathbf{757}_0$, and sets the delayed data as DIN0_8. That is, the delay circuits $\mathbf{751}_0$, $\mathbf{752}_0$, . . . , $\mathbf{758}_0$ sequentially delay DIN0 and thereby output DIN0_1, DIN0_2, . . . , DIN0_8, respectively.

The selector $\mathbf{76}_0$ selects one item of data from among DIN0_1 through DIN0_8 output from the delay circuits $\mathbf{751}_0$ through $\mathbf{758}_0$, respectively, on the basis of A0, B0, and C0 corresponding to the 0-th bit of the selection signals ABC, and outputs the selected item of data as data D0 which has been subjected to phase adjustment. In this case, an item of data may be selected on the basis of A0, B0, and C0 in the following manner. First, A0 is set as the first bit of binary data from the right, B0 is set as the second bit of the binary data from the right, and C0 is set as the third bit of the binary data from the right. In this case, if the value of the resulting binary data is N, DIN0_(N+1) is selected.

The bit phase adjusting sections $\mathbf{74}_1$ through $\mathbf{74}_{31}$ are configured similarly to the bit phase adjusting section $\mathbf{74}_0$, and an explanation thereof will thus be omitted.

Figure 3:
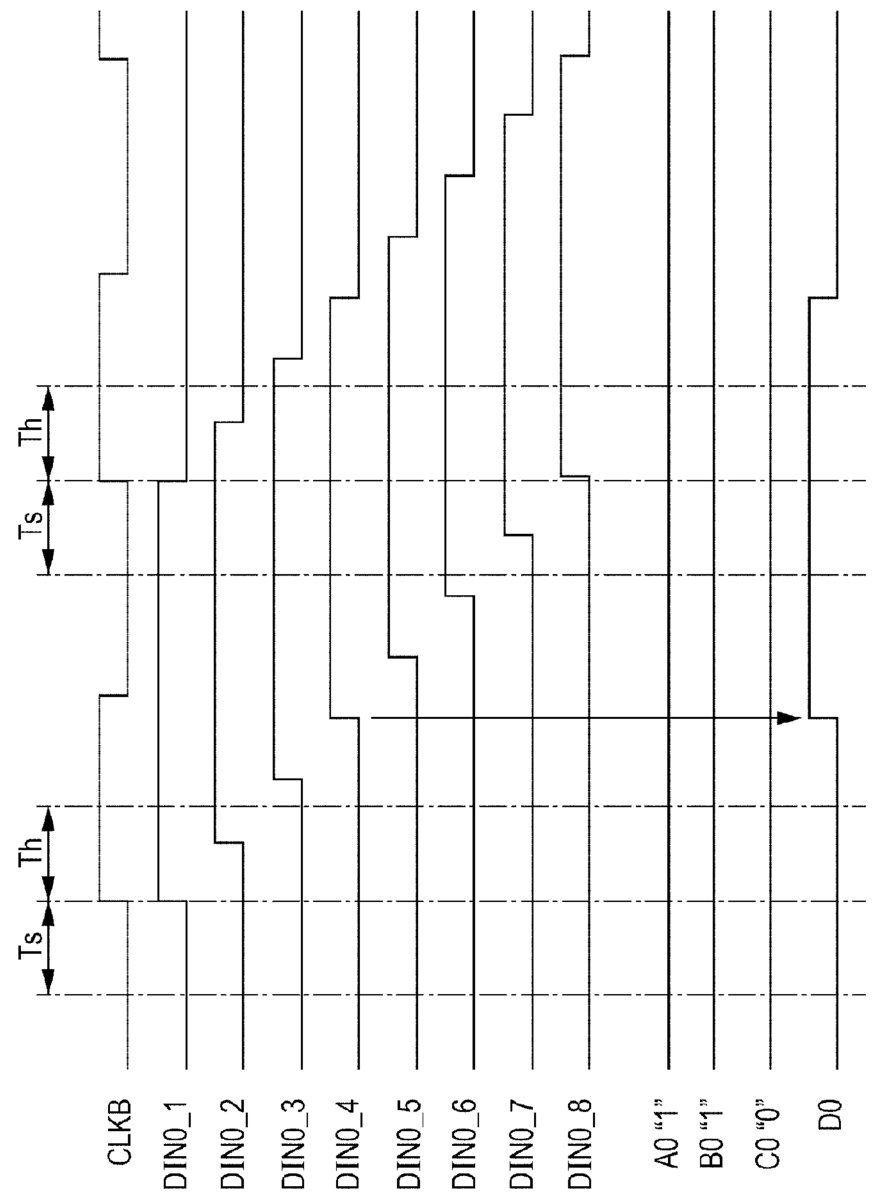
FIG. 3 illustrates a specific example of a data phase adjustment operation performed by a first phase adjusting unit according to the first exemplary embodiment.

FIG. 3 illustrates a specific example of a data phase adjustment operation performed by the first phase adjusting unit 71.

As shown in FIG. 3, concerning DIN0_1, DIN0_2, DIN0_7, and DIN0_8, the values are changed during the setup time Ts or the hold time Th of the reference signal CLKB, and thus, it is not possible to stably extract data from these items of data. In contrast, concerning DIN0_3, DIN0_4, DIN0_5, and DIN0_6, the values are not changed during the setup time Ts or the hold time Th of the reference signal CLKB, and thus, it is possible to stably extract data from these items of data.

Accordingly, A0, B0, and C0 are set to be, for example, 1, 1, and 0, respectively, and DIN0_4 is set as D0, as indicated by the arrow in FIG. 3, thereby stably extracting data from D0.

Figure 4:
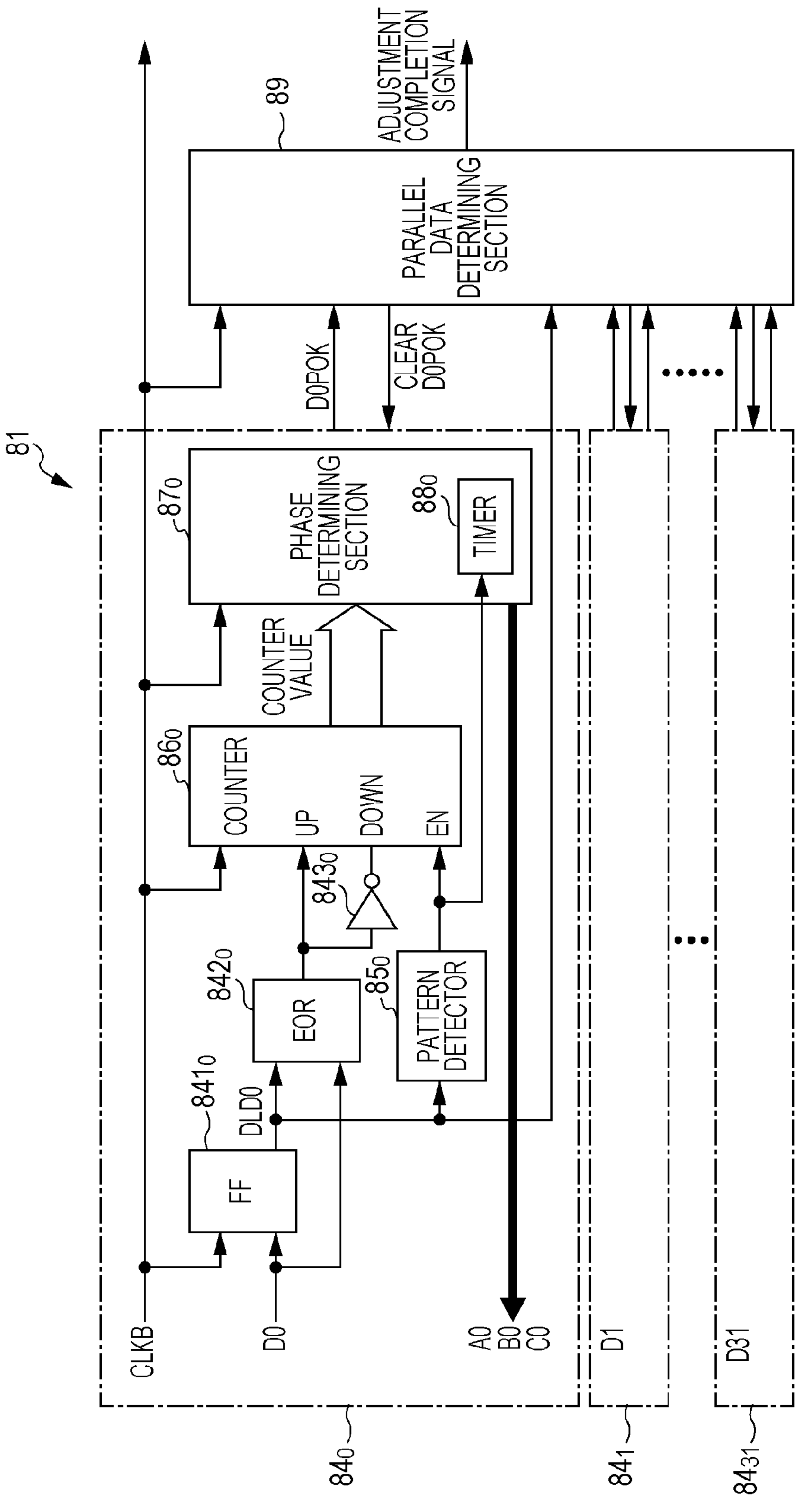
FIG. 4 is a block diagram illustrating an example of the internal configuration of a second phase adjusting unit.

FIG. 4 is a block diagram illustrating an example of the internal configuration of the second phase adjusting unit 81.

In the first through third exemplary embodiments, since 32-bit parallel data is handled, as shown in FIG. 4, the second phase adjusting unit 81 includes phase detectors $\mathbf{84}_0$, $\mathbf{84}_1$, . . . , $\mathbf{84}_{31}$. The second phase adjusting unit 81 also includes a parallel data determining section 89.

The phase detector $\mathbf{84}_0$ includes a flip-flop (FF) $\mathbf{841}_0$, an exclusive-OR logic circuit (EOR) $\mathbf{842}_0$, an inverter $\mathbf{843}_0$, a pattern detector $\mathbf{85}_0$, a counter $\mathbf{86}_0$, a phase determining section $\mathbf{87}_0$, and a timer $\mathbf{88}_0$.

The FF $\mathbf{841}_0$ outputs, as data DLD0, data D0 obtained as a result of adjusting the phase by using the bit phase adjusting section $\mathbf{74}_0$ in synchronization with the reference signal CLKB.

The EOR $\mathbf{842}_0$ outputs data obtained by performing an exclusive-OR operation between data D0 and data DLD0 to the UP terminal of the counter $\mathbf{86}_0$, and outputs data obtained by inverse-converting the data subjected to an exclusive-OR operation in the EOR $\mathbf{842}_0$ by using the inverter $\mathbf{843}_0$ to the DOWN terminal of the counter $\mathbf{86}_0$. That is, if D0 and DLD0 are different, the EOR $\mathbf{842}_0$ outputs “1” to the UP terminal and outputs “0” to the DOWN terminal. In contrast, if D0 and DLD0 are the same, the EOR $\mathbf{842}_0$ outputs “0” to the UP terminal and outputs “1” to the DOWN terminal.

The pattern detector $\mathbf{85}_0$ detects a predetermined pattern from data DLD0, and when the predetermined pattern is detected, the pattern detector $\mathbf{85}_0$ outputs “1” to the EN terminal of the counter $\mathbf{86}_0$ and also to the timer $\mathbf{88}_0$.

While “1” is being input into the EN terminal, the counter $\mathbf{86}_0$ adds “1” if “1” is input into the UP terminal, and subtracts “1” if “1” is input into the DOWN terminal, and outputs the resulting counter value to the phase determining section $\mathbf{87}_0$.

If “1” is input from the pattern detector $\mathbf{85}_0$, the phase determining section $\mathbf{87}_0$ starts the timer $\mathbf{88}_0$, and when the timer value has reached a predetermined value, the phase determining section $\mathbf{87}_0$ determines whether the counter value output from the counter $\mathbf{86}_0$ has reached a predetermined value. If the counter value has reached the predetermined value, the phase determining section $\mathbf{87}_0$ outputs a phase set signal D0POK (“1” is set) to the parallel data determining section 89. If the counter value has not reached the predetermined value, the phase determining section $\mathbf{87}_0$ changes the selection signals A0, B0, and C0 and outputs the changed selection signals A0, B0, and C0 to the bit phase adjusting section $\mathbf{74}_0$. The phase determining section $\mathbf{87}_0$ may receive a signal indicating an instruction to clear the phase set signal D0POK from the parallel data determining section 89, in which case, the phase determining section $\mathbf{87}_0$ performs the operation as that described above again.

The configurations of the phase detectors $\mathbf{84}_1$, . . . , $\mathbf{84}_{31}$ are the same as the configuration of the phase detector $\mathbf{84}_0$, and an explanation thereof will thus be omitted.

The phase detectors $\mathbf{84}_0$, $\mathbf{84}_1$, . . . , $\mathbf{84}_{31}$ and the above-described bit phase adjusting sections $\mathbf{74}_0$, $\mathbf{74}_1$, . . . , $\mathbf{74}_{31}$ serve as an example of a first adjusting circuit.

Upon receiving phase set signals D0POK, . . . , D31POK from the phase determining sections $\mathbf{87}_0$, . . . , $\mathbf{87}_{31}$, respectively, the parallel data determining section 89 determines whether DLD0, . . . , DLD31 received from the FF $\mathbf{841}_0$, . . . , $\mathbf{841}_{31}$, respectively, are the same as adjusting data. If DLD0, . . . , DLD31 received from the FF $\mathbf{841}_0$, . . . , $\mathbf{841}_{31}$, respectively, are the same as adjusting data, the parallel data determining section 89 outputs an adjustment completion signal indicating the completion of adjustment of the phase of parallel data to the adjusting data generator 31. If DLD0, . . . , DLD31 received from the FF $\mathbf{841}_0$, . . . , $\mathbf{841}_{31}$, respectively, are not the same as adjusting data, the parallel data determining section 89 outputs a signal indicating an instruction to clear a phase set signal DNPOK concerning a bit which is different from the associated bit of the adjusting data (e.g., the N-th bit) to the phase determining section $\mathbf{87}_N$.

The parallel data determining section 89 and the above-described bit phase adjusting sections $\mathbf{74}_0$, $\mathbf{74}_1$, . . . , $\mathbf{74}_{31}$ and the above-described phase detectors $\mathbf{84}_0$, $\mathbf{84}_1$, . . . , $\mathbf{84}_{31}$ serve as an example of a second adjusting circuit.

Figure 5:
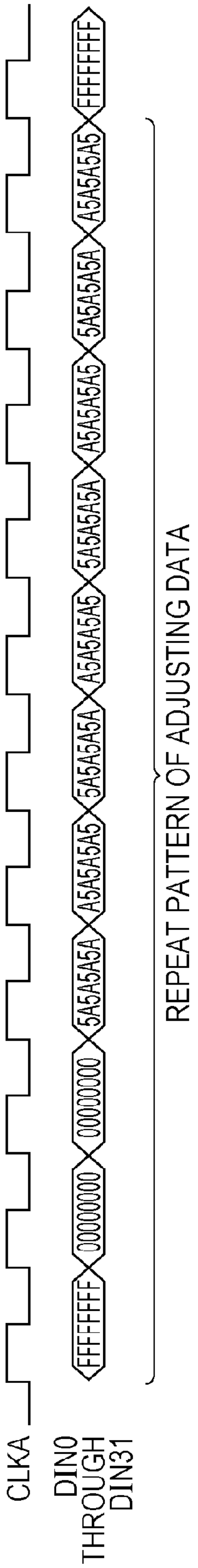
FIG. 5 illustrates an example of adjusting data.
Figure 6:
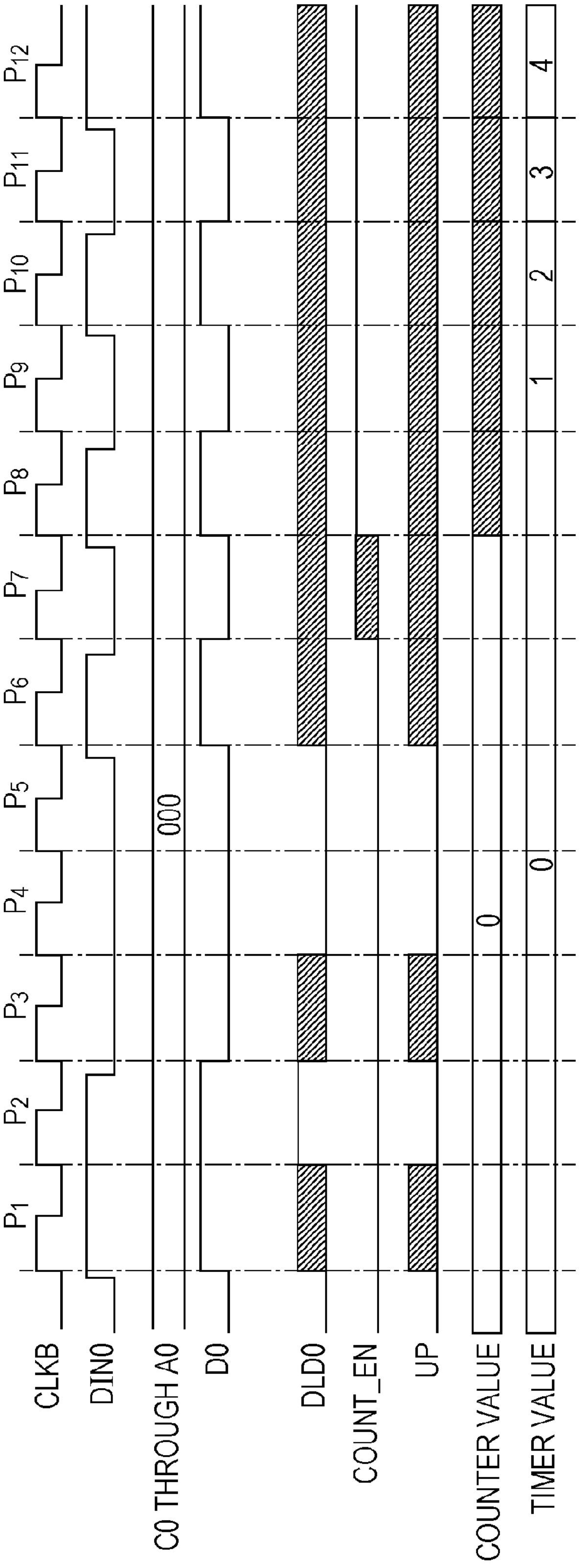
FIGS. 6 and 7 illustrate specific examples of a phase detection operation performed by a phase detector.
Figure 7:
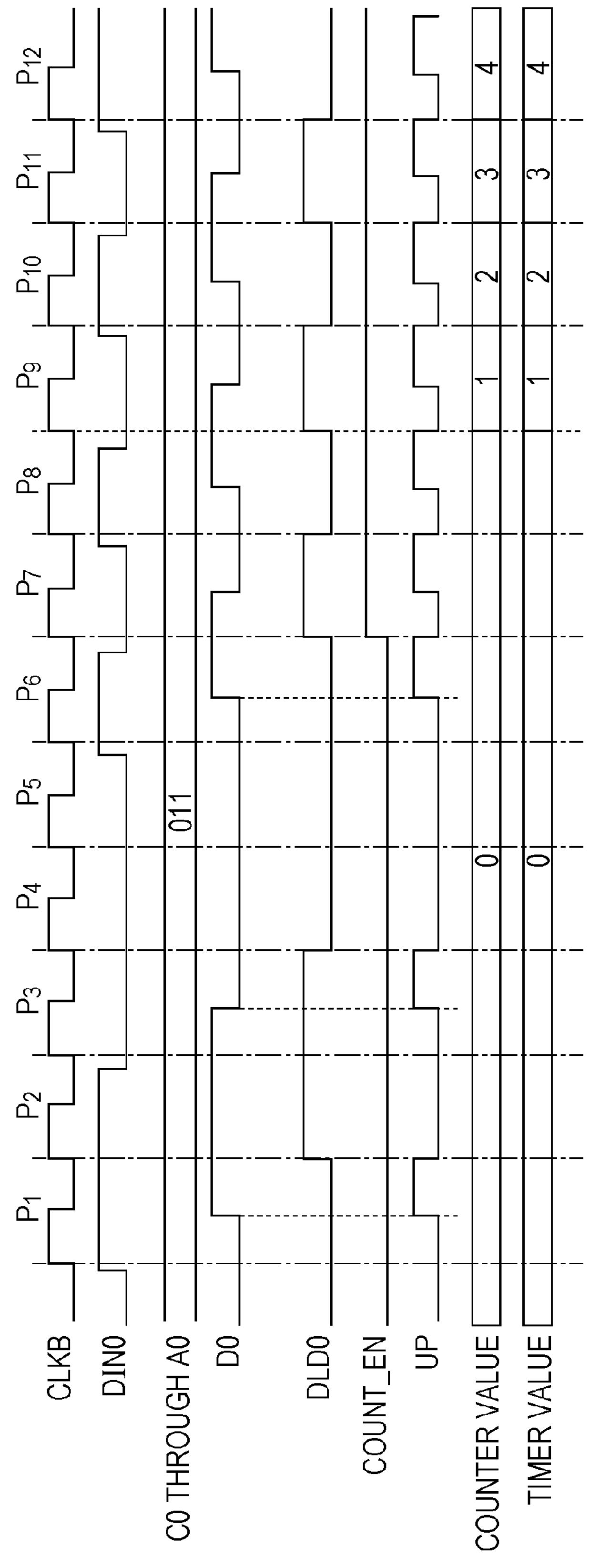

FIGS. 5 through 7 illustrate a specific example of a phase detection operation performed by the phase detector $\mathbf{84}_0$.

An example of adjusting data, which serves as the basis of this specific example of the phase detection operation, will first be discussed with reference to FIG. 5.

As shown in FIG. 5, adjusting data is transmitted as DIN0, . . . , DIN31 from the previous stage (first block) in synchronization with the reference signal CLKA. In FIG. 5, the adjusting data is indicated such that the first bit is "FFFFFFFF", the second and third bits are "00000000", the fourth, sixth, eighth, and tenth bits are "5A5A5A5A", and the fifth, seventh, ninth, and eleventh bits are "A5A5A5A5". The adjusting data written as described above means that the adjusting data is arranged as follows.

The first bits of DIN0 . . . DIN31 are all "1".

The second bits of DIN0 . . . DIN31 are all "0".

The third bits of DIN0 . . . DIN31 are also all "0".

The fourth bits are "0", "1", "0", "1", "1", "0", "1", "0", . . . , "0", "1", "0", "1", "1", "0", "1", and "0" in order from DIN0 to DIN31.

The fifth bits are "1", "0", "1", "0", "0", "1", "0", "1", . . . , "1", "0", "1", "0", "0", "1", "0", and "1" in order from DIN0 to DIN31.

The sixth bits are "0", "1", "0", "1", "1", "0", "1", "0", . . . , "0", "1", "0", "1", "1", "0", "1", and "0" in order from DIN0 to DIN31.

The seventh bits are "1", "0", "1", "0", "0", "1", "0", "1", . . . , "1", "0", "1", "0", "0", "1", "0", and "1" in order from DIN0 to DIN31.

The eighth bits are "0", "1", "0", "1", "1", "0", "1", "0", . . . , "0", "1", "0", "1", "1", "0", "1", and "0" in order from DIN0 to DIN31.

The ninth bits are "1", "0", "1", "0", "0", "1", "0", "1", . . . , "1", "0", "1", "0", "0", "1", "0", and "1" in order from DIN0 to DIN31.

The tenth bits are "0", "1", "0", "1", "1", "0", "1", "0", . . . , "0", "1", "0", "1", "1", "0", "1", and "0" in order from DIN0 to DIN31.

The eleventh bits are "1", "0", "1", "0", "0", "1", "0", "1", . . . , "1", "0", "1", "0", "0", "1", "0", and "1" in order from DIN0 to DIN31.

Accordingly, for example, DIN0 has "1", "0", "0", "0", "1", "0", "1", "0", "1", "0", "1".

FIG. 6 illustrates an example of a case in which the phase detector 84$_0$ is unable to set the phase. In FIG. 6, after the lapse of two periods after the pattern detector 85$_0$ has detected "1", "0", "0" from DLD0, "1" is input into the EN terminal of the counter 86$_0$, and the timer 88$_0$ starts counting. In FIG. 6, hatched portions indicate that the value is undefined.

In this example, as indicated by the row C0 through A0, the phase determining section 87$_0$ outputs "0", "0", "0" as the selection signals A0, B0, and C0, respectively, to the bit phase adjusting section 74$_0$.

Then, the bit phase adjusting section 74$_0$ selects DIN0_1, which is obtained by delaying DIN0 by a small amount by using the selector 76$_0$. As a result, D0 is shown as the data indicated by the row D0. More specifically, adjusting data is transmitted as "1", "0", "0", "0", "1", "0", "1", "0", "1", "0", "1" from the start points of the periods $P_2$, $P_3$, . . . $P_{12}$, respectively.

In this example, the value of D0 is changed during the setup time or the hold time of the reference signal CLKB. Accordingly, as indicated by the row DLD0, even if data is extracted from D0 in synchronization with the reference signal CLKB, only "1", "0", and "0" in the periods $P_2$, $P_4$, and $P_5$ can be stably extracted, and data in the other periods are logically undefined.

In this manner, since DLD0 in the period $P_3$ is logically undefined, the input into the EN terminal of the counter 86$_0$ becomes logically undefined in the period $P_7$, as indicated by the COUNT_EN.

Since DLD0 in the periods other than the periods $P_2$, $P_4$, and $P_5$ is logically undefined, the input into the UP terminal of the counter 86$_0$ also becomes logically undefined in the periods other than the periods $P_2$, $P_4$, and $P_5$, as indicated by the row UP.

Additionally, after the period $P_8$ in which the input into the EN terminal of the counter 86$_0$ becomes "1", the input into the UP terminal of the counter 86$_0$ is logically undefined, and thus, the counter value is also undefined.

Moreover, since the input into the EN terminal of the counter 86$_0$ is logically undefined in the period $P_7$, the period at which the timer 88$_0$ starts counting the timer value (which indicates the phase stability determining period) is also undefined. For the sake of description, however, it is assumed that the timer value starts to increase from the period $P_9$. In the first through third exemplary embodiments, if the counter value is increased in accordance with an increase in the timer value, the phase detector 84$_0$ determines that data can be stably extracted. In this example, however, since the counter value is undefined, the phase detector 84$_0$ does not determine that data can be stably extracted.

In contrast, FIG. 7 illustrates an example of a case in which the phase detector 84$_0$ is able to set the phase.

In this example, as indicated by the row C0 through A0, the phase determining section 87$_0$ outputs "1", "1", "0" as the selection signals A0, B0, and C0, respectively, to the bit phase adjusting section 74$_0$.

Then, the bit phase adjusting section 74$_0$ selects DIN0_4, which is obtained by delaying DIN0 by a larger amount than DIN0_1 by using the selector 76$_0$. Thus, D0 is shown as data indicated by the row D0. More specifically, adjusting data is transmitted as "1", "0", "0", "0", "1", "0", "1", "0", "1", "0", "1" from the start points of the periods $P_2$, $P_3$, . . . $P_{12}$, respectively.

In this example, the value of D0 is not changed during the setup time or the hold time of the reference signal CLKB. Accordingly, as indicated by the row DLD0, all the items of data in all the periods can be stably extracted from D0 in synchronization with the reference signal CLKB.

Accordingly, as indicated by the row COUNT_EN, the input into the counter 86$_0$ in the period $P_8$ is "1".

As indicated by the row UP, the input into the UP terminal of the counter 86$_0$ is "1" when D0 and DLD0 are different, and is "0" when D0 and DLD0 are the same.

Additionally, after the period $P_8$ at which the input into the EN terminal of the counter 86$_0$ is "1", when the input into the UP terminal of the counter 86$_0$ becomes "1", the counter value starts to increase.

Moreover, from the start of the period $P_8$ at which the input into the EN terminal of the counter 86$_0$ becomes "1", the timer 88$_0$ starts counting the timer value (which indicates the phase stability determining period) from "0". In the first through third exemplary embodiments, as stated above, if the counter value is increased in accordance with an increase in the timer value, the phase detector 84$_0$ determines that data can be stably extracted. In this example, since the counter value is increased in accordance with an increase in the timer value, the phase detector 84$_0$ determines that data can be stably extracted.

A description will now be given of operations of the phase determining section 87 and the parallel data determining section 89. Since all the phase determining sections 87$_0$, 87$_1$, . . . , 87$_{31}$ perform the same operation, the phase determining section is denoted by 87 without a subscript, assuming that it represents all the phase determining sections 87$_0$, 87$_1$, . . . , 87$_{31}$. The bit phase adjusting section 74, the phase detector 84, and the components thereof will also be denoted by reference numerals without a subscript. Additionally, "**" indicates one of the numbers 0, 1, . . . , 31.

Figure 8:
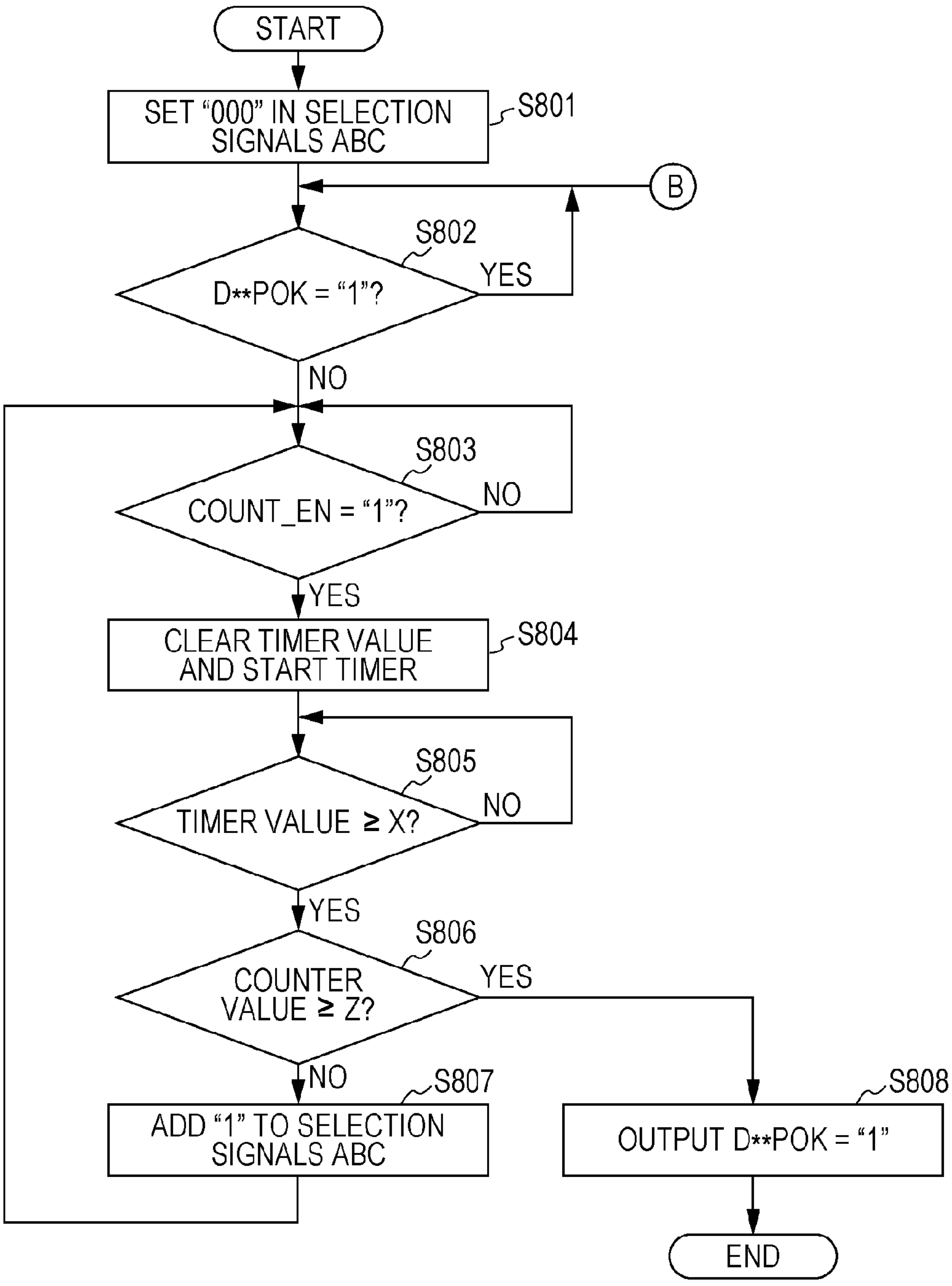
FIG. 8 is a flowchart illustrating an example of an operation performed by a phase determining section.

FIG. 8 is a flowchart illustrating an example of the operation performed by the phase determining section 87.

In step S801, the phase determining section 87 first sets "000" in selection signals ABC. More specifically, "0" is set in A, "0" is set in B, and "0" is set in C, and A, B, and C are output to the bit phase adjusting section 74 as selection signals.

Then, in step S802, the phase determining section 87 determines whether the phase set signal DPOK is "1". If the phase set signal DPOK is "1", the phase determining section 87 repeats step S802. Step S802 will be described in detail later with reference to FIG. 9B.

If the phase determining section 87 determines in step S802 that the phase set signal DPOK is not "1", the process proceeds to step S803. In step S803, the phase determining section 87 determines whether the signal COUNT_EN output from the pattern detector 85 is "1". That is, the phase determining section 87 determines whether the predetermined pattern of the adjusting data has been detected by the pattern detector 85. If the signal COUNT_EN is not "1", the phase determining section 87** repeats step S803.

If the signal COUNT_EN is "1", the process proceeds to step S804. In step S804, the phase determining section 87 clears the timer value of the timer 88 used for measuring the phase stability determining period, and starts the timer 88. The phase determining section 87 then determines in step S805 whether the timer value has reached a predetermined value X. If the timer value has not reached the predetermined value X, the phase determining section 87 repeats step S805.

If the timer value has reached the predetermined value X, the phase determining section 87 proceeds to step S806 to determine whether the counter value of the counter 86 for detecting phase stability has reached a predetermined value Z. In this case, the following relationship is assumed: in a case in which the phase of D0 has been adjusted to such a degree as to stably extract data, if the timer value has reached the predetermined value X, it is expected that the counter value has also reached a certain value. The above-described predetermined value Z is the certain value in this relationship. If the counter value has not reached the predetermined value Z, the phase determining section 87 proceeds to step S807. In step S807, the phase determining section 87 adds "1" to the selection signals ABC and then returns to step S803. If the counter value has reached the predetermined value Z, the phase determining section 87 proceeds to step S808. In step S808, the phase determining section 87 outputs "1" to the parallel data determining section 809 as D**POK.

Figure 9A:
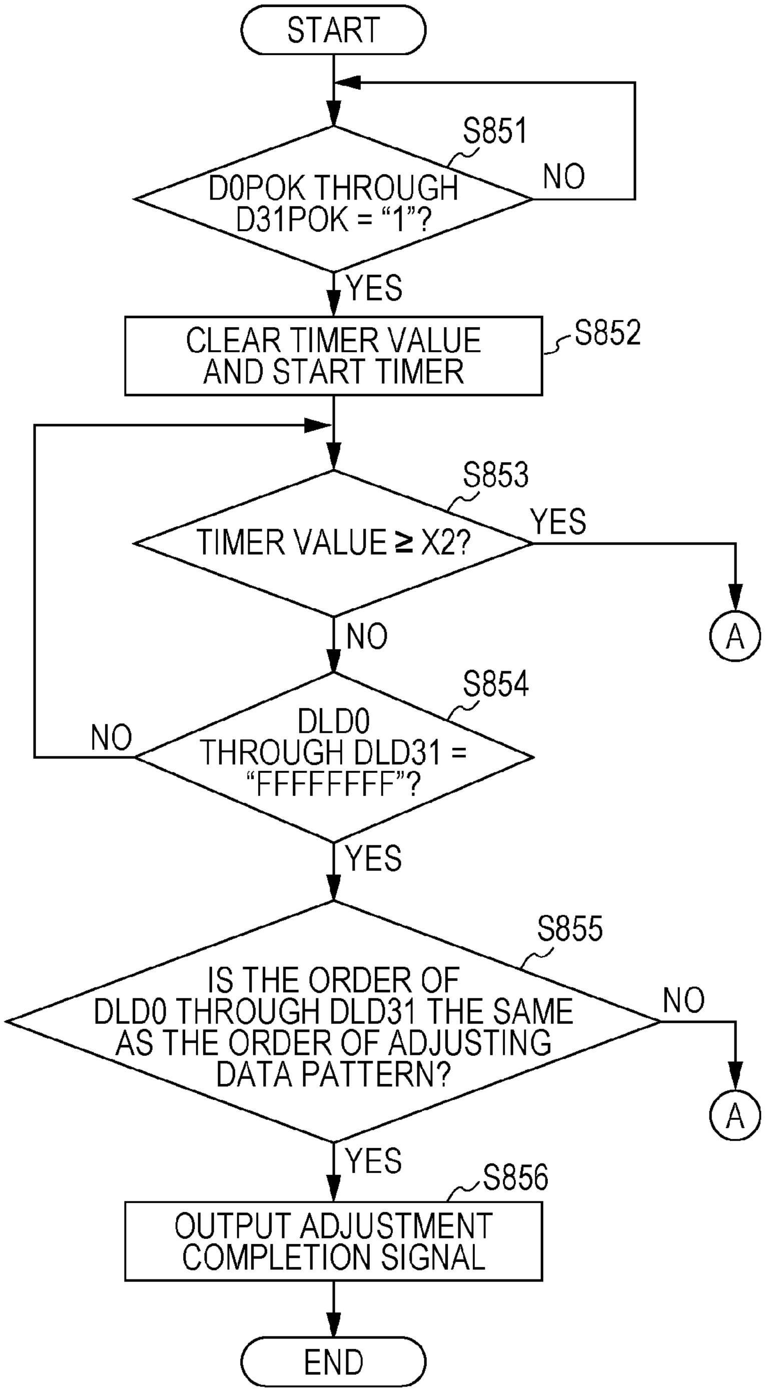
FIGS. 9A and 9B are flowcharts illustrating an example of an operation performed by a parallel data determining section.
Figure 9B:
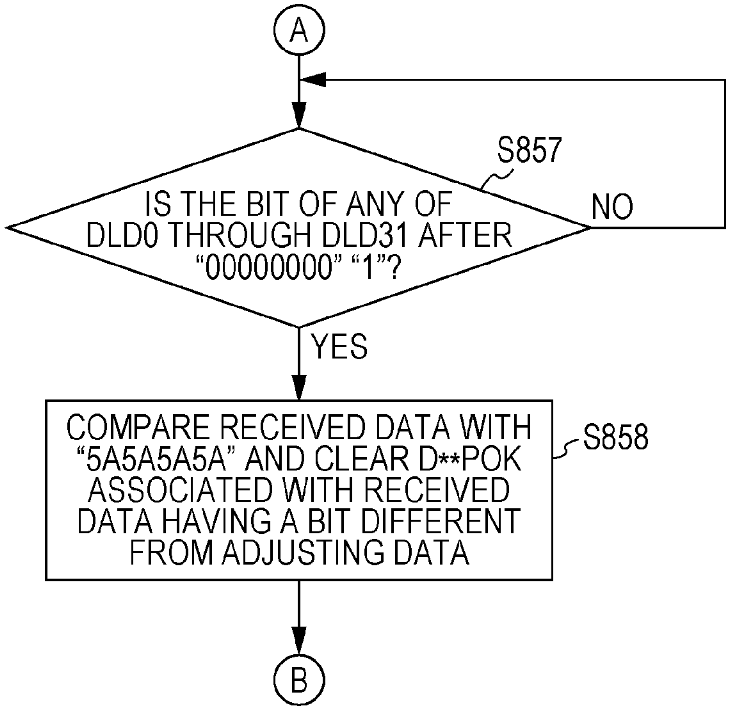

FIGS. 9A and 9B are flowcharts illustrating an example of an operation performed by the parallel data determining section 89.

In step S851, the parallel data determining section 89 determines whether the phase set signals D0POK, D1POK, . . . , D31POK output from the phase determining sections $87_0$, $87_1$, . . . , $87_{31}$, respectively, are all "1". If not all the phase set signals D0POK, D1POK, . . . , D31POK are "1", the parallel data determining section 809 repeats step S851.

If all the phase set signals D0POK, D1POK, . . . , D31POK are "1", the process proceeds to step S852. In step S852, the parallel data determining section 89 clears the timer value of a timer for measuring the parallel data determining period, and then starts the timer. The parallel data determining section 89 determines in step S853 whether the timer value has reached a predetermined value X2. If the timer value has not reached the predetermined value X2, the parallel data determining section 89 proceeds to step S854 to determine whether DLD0, DLD1, . . . , DLD31 output from the FF $841_0$, FF $841_1$, . . . , $841_{31}$, respectively, are all "FFFFFFFF". That is, the parallel data determining section 89 determines whether DLD0, DLD1, . . . , DLD 31 are all "1".

If not all the data items DLD0, DLD1, . . . , DLD31 are "FFFFFFFF", the parallel data determining section 89 returns to step S853.

If DLD0, DLD1, . . . , DLD31 output from the FF $841_0$, FF $841_1$, . . . , $841_{31}$, respectively, are all "FFFFFFFF", the process proceeds to step S855. In step S855, the parallel data determining section 89 determines whether the order of DLD0, DLD1, . . . , DLD31 is the same as the pattern order of the adjusting data. That is, the parallel data determining section 89 determines whether, after "FFFFFFFF", data is output in the order of "0000000", "00000000", "5A5A5A5A", "A5A5A5A5", "5A5A5A5A", "A5A5A5A5", "5A5A5A5A", "A5A5A5A5", "5A5A5A5A", "A5A5A5A5".

If the parallel data determining section 89 determines that the order of DLD0, DLD1, . . . , DLD31 is the same as the pattern order of the adjusting data, the process proceeds to step S856. In step S856, the parallel data determining section 89 outputs an adjustment completion signal to the adjusting data generator 31.

If it is determined in step S853 that the timer value has reached the predetermined value X2 before it is determined in step S854 that all the data items DLD0, DLD1, . . . , DLD31 are "FFFFFFFF", or if it is determined in step S855 that the order of DLD0, DLD1, . . . , DLD31 is not the same as the pattern order of the adjusting data, the parallel data determining section 89 performs the operation indicated by the flowchart of FIG. 9B.

In step S857, the parallel data determining section 89 determines whether "00000000" is output as DLD0, DLD1, . . . , DLD31 and whether the associated bit of any of DLD0, DLD1, . . . , DLD31 is "1" after "00000000". Then, if none of the associated bit of DLD0, DLD1, . . . , DLD31 is "1", the parallel data determining section 89 repeats step S857.

If the associated bit of any of DLD0, DLD1, . . . , DLD31 is "1" after "00000000", the process proceeds to step S858. In step S858, the parallel data determining section 89 compares DLD0, DLD1, . . . , DLD31 with "5A5A5A5A" so as to determine a data item having a bit different from the associated bit of the adjusting data, and then outputs a signal indicating an instruction to clear the phase set signal DPOK associated with the different bit to the associated phase determining section 87**.

Upon receiving the signal indicating an instruction to clear the phase set signal DPOK, the phase determining section 87 determines in step S802 of FIG. 8 that DPOK is not "1", and performs the processing from step S803 again.

Second Exemplary Embodiment

In the second exemplary embodiment, circuit components within a semiconductor integrated circuit are divided into plural blocks, and each of the divided blocks is synchronized with the same reference signal. It is now assumed that the plural blocks are constituted by a first block and a second block and that the second block is disposed subsequent to the first block. At a data connecting portion for connecting the first block and the second block, a switching unit for switching between normal parallel data (hereinafter referred to as "normal data") and parallel data used for adjusting the phase (hereinafter referred to as "adjusting data") is provided at an input section of a flip-flop disposed at the output stage of the first block. The normal data represents the result of data processing performed by the first block. Additionally, the second block is provided with a generator for generating plural reference signals having different phases and a first adjusting unit for detecting a phase shift of parallel data input from the first block (hereinafter also referred to as "input data"). The first adjusting unit detects a phase shift of input data with reference to a certain reference signal selected from among the plural reference signals and adjusts the phase of the input data. If correct parallel data has not been extracted from data obtained by adjusting the phase of the input data, the first adjusting unit adjusts the phase of the input data again by switching to another reference signal from among the plural reference signals. The second block is also provided with a second adjusting unit for performing adjustment so that parallel data received as a result of performing data processing (hereinafter referred to as "received data") by the second block will match the adjusting data output from the first block.

Figure 10:
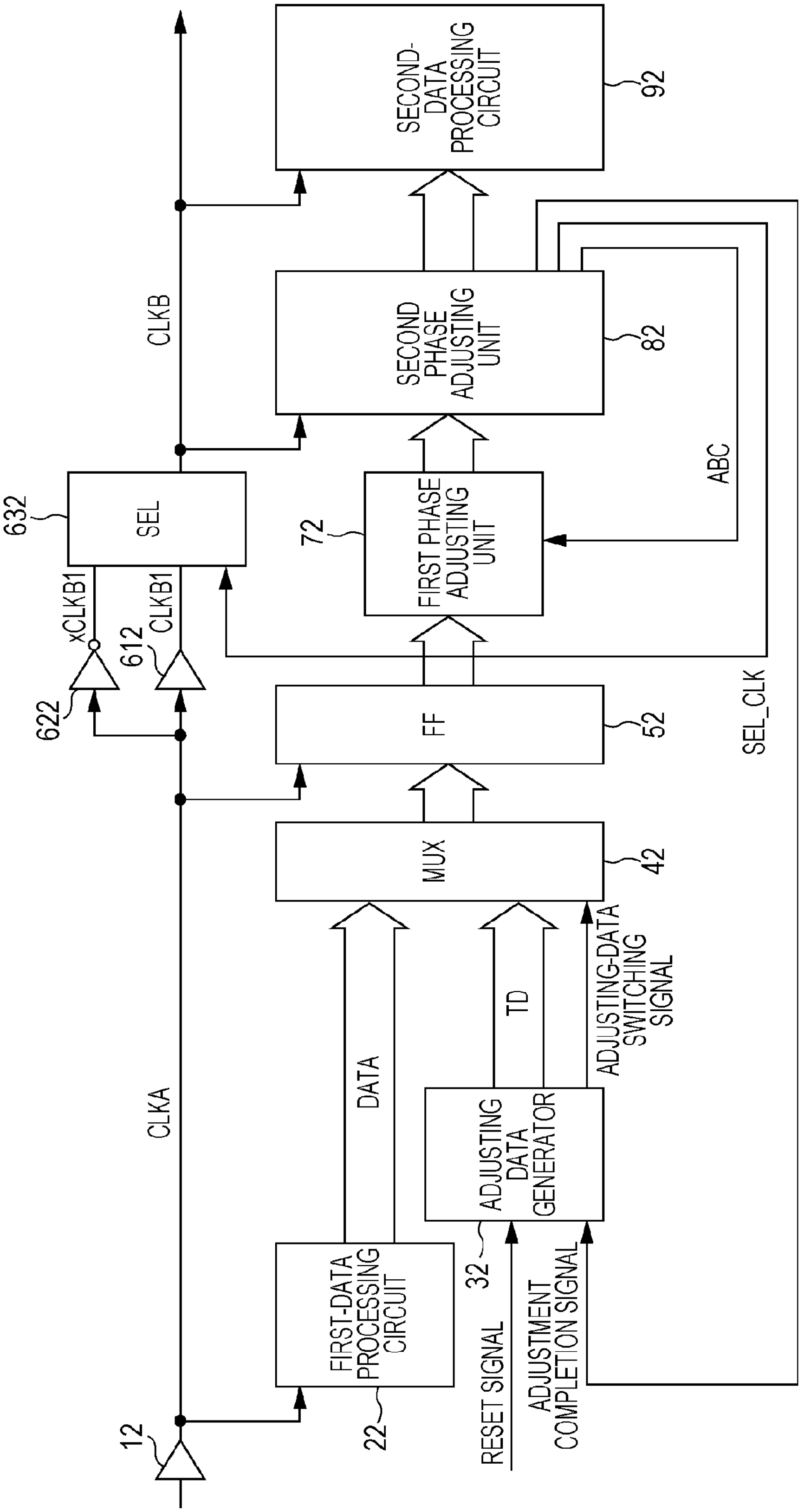
FIG. 10 is a block diagram illustrating an example of the configuration of a data processing circuit according to a second exemplary embodiment.

FIG. 10 is a block diagram illustrating an example of the configuration of a data processing circuit according to the second exemplary embodiment.

The data processing circuit is constituted by a first block and a second block, which is disposed subsequent to the first block. The first block is synchronized with a reference signal CLKA, which is an example of a first reference signal, delayed in a delay circuit 12. The second block is synchronized with a reference signal CLKB, which is an example of a second reference signal, separated from the reference signal CLKA. As shown in FIG. 10, the data processing circuit includes, as the first block, a first-data processing circuit 22, an adjusting data generator 32, a MUX 42, and a FF 52. The data processing circuit includes, as the second block, a first phase adjusting unit 72, a second phase adjusting unit 82, and a second-data processing circuit 92. The major difference between the second exemplary embodiment and the first exemplary embodiment is the following point. A reference signal CLKB1 is separated from the reference signal CLKA in a delay circuit 612, and a reference signal xCLKB1 is separated from the reference signal CLKA and is inverted from the reference signal CLKB1 by 180° in an inverter 622. A selector 632 selects one of the reference signals CLKB1 and xCLKB1 on the basis of a selection signal SEL_CLK output from the second phase adjusting unit 82, thereby generating the reference signal CLKB. In the second exemplary embodiment, the selector 632 is provided as an example of a selection circuit.

The first-data processing circuit 22, the adjusting data generator 32, the MUX 42, and the FF 52 are the same as the first-data processing circuit 21, the adjusting data generator 31, the MUX 41, and the FF 51, respectively, of the first exemplary embodiment, and an explanation thereof will thus be omitted.

The first phase adjusting unit 72 is different from the first phase adjusting unit 71 in that it is operated, not in accordance with a single reference signal, but in accordance with a reference signal selected from the reference signals CLKB1 and xCLKB1. However, the basic configuration and operation of the first phase adjusting unit 72 is the same as that of the first phase adjusting unit 71.

The second phase adjusting unit 82 is also different from the first phase adjusting unit 81 in that it is operated, not in accordance with a single reference signal, but in accordance with a reference signal selected from the reference signals CLKB1 and xCLKB1. However, the basic configuration and operation of the second phase adjusting unit 82 is the same as that of the second phase adjusting unit 81. More specifically, the second phase adjusting unit 82 also includes phase detectors $\mathbf{84}_0$, $\mathbf{84}_1$, . . . , $\mathbf{84}_{31}$, and a parallel data determining section 89. The phase detector $\mathbf{84}_0$, for example, includes a FF $\mathbf{841}_0$, an exclusive-OR logic circuit (EOR) $\mathbf{842}_0$, an inverter $\mathbf{843}_0$, a pattern detector $\mathbf{85}_0$, a counter $\mathbf{86}_0$, a phase determining section $\mathbf{87}_0$, and a timer $\mathbf{88}_0$. The functions of the elements forming the second phase adjusting unit 82 are basically the same as those of the second phase adjusting unit 81. However, the phase determining section $\mathbf{87}_0$ of the second phase adjusting unit 82 differs from that of the second phase adjusting unit 81 in that it outputs the selection signal SEL_CLK to the selector 632 if the setting of the phase of the input data has failed.

Figure 11:
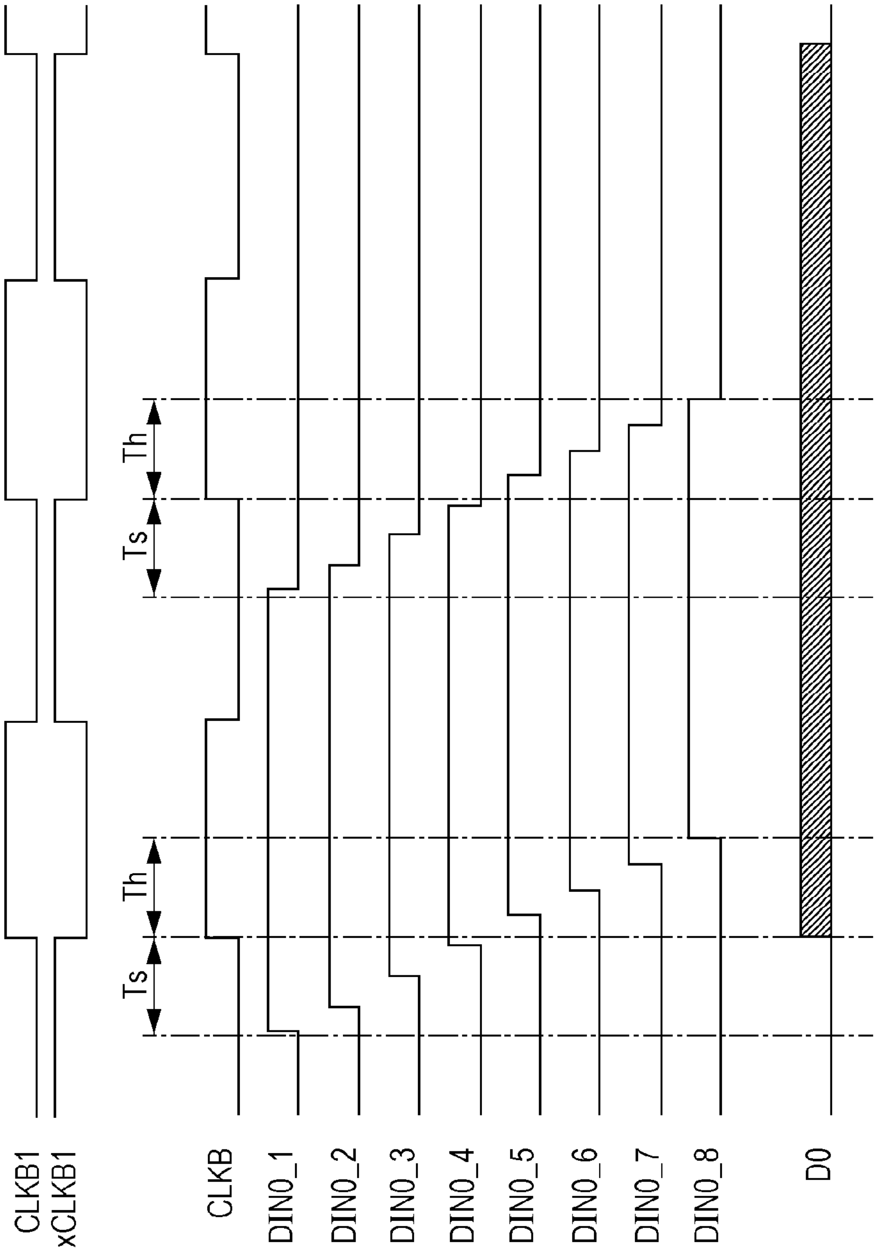
FIGS. 11 and 12 illustrate specific examples of a data phase adjustment operation performed by a first phase adjusting unit according to the second exemplary embodiment.
Figure 12:
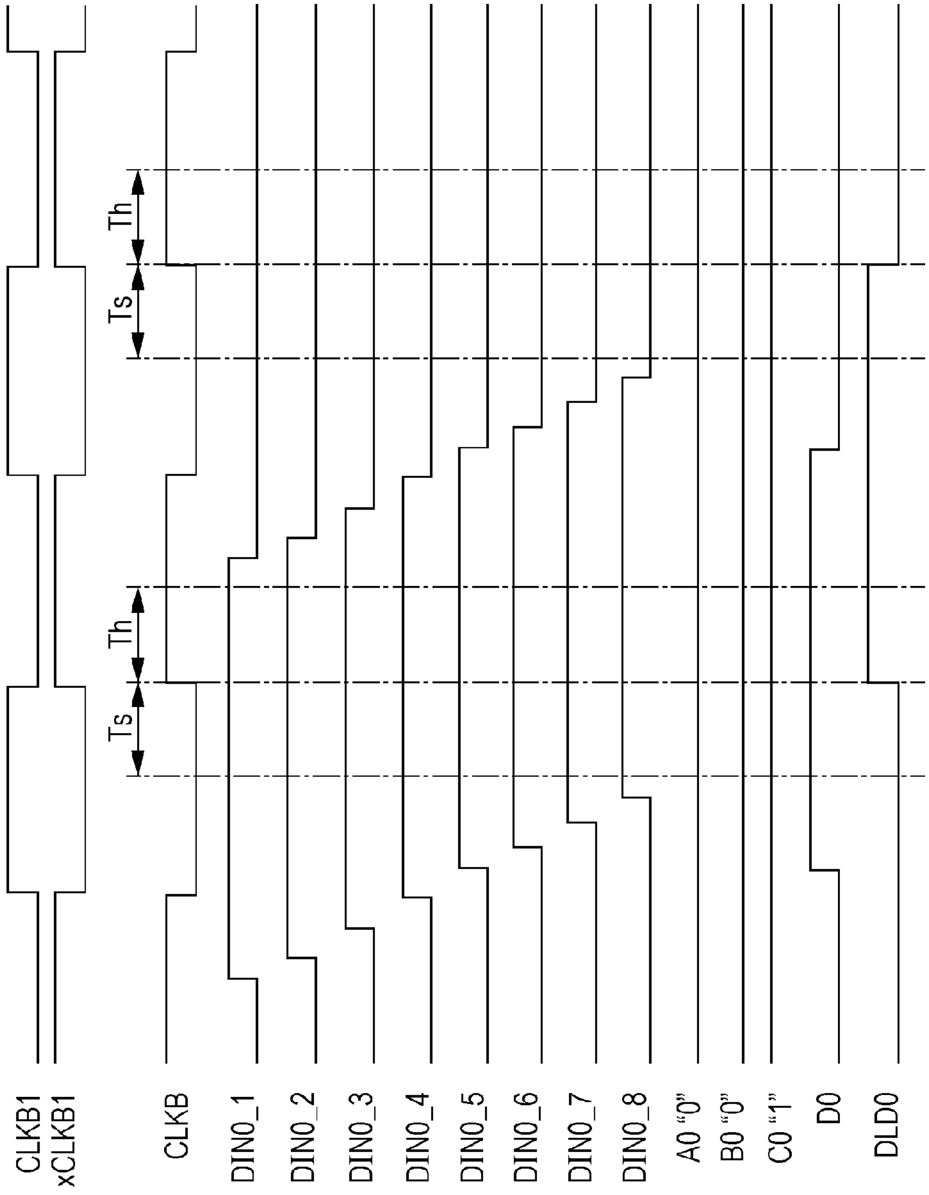

FIGS. 11 and 12 illustrate specific examples of a data phase adjustment operation performed by the first phase adjusting unit 72.

FIG. 11 illustrates an example of a case in which the selector 632 selects the reference signal CLKB1 as the reference signal CLKB. In FIG. 11, the hatched portion indicates that the value is undefined.

In this example, as shown in FIG. 11, in DIN0_1, . . . , DIN0_8, the values are changed during the setup time Ts or the hold time Th of the reference signal CLKB. Accordingly, data is not stably extracted from these items of data, as indicated by the row D0.

In contrast, FIG. 12 illustrates an example of a case in which the selector 632 selects the reference signal xCLKB1 as the reference signal CLKB.

In this example, as shown in FIG. 12, in DIN0_1, . . . , DIN0_8, the values are not changed during the setup time Ts or the hold time Th of the reference signal CLKB. Accordingly, data is stably extracted from these items of data.

Thus, "0", "0", "1", for example, are set in A0, B0, and C0, respectively, and DIN_5 is selected as D0, thereby making it possible to stably extract data from D0. In FIG. 12, DLD0, which is obtained by stably extracting data from D0 by using the second phase adjusting unit 82, is also shown.

In the second exemplary embodiment, a phase detection operation is performed by the phase detector $\mathbf{84}_0$, as shown in FIGS. 5 through 7, as in the first exemplary embodiment, and an explanation thereof will thus be omitted.

The operation performed by the phase determining section 87 of the second exemplary embodiment is merely slightly different from that of the first exemplary embodiment. That is, in step S807, if the value obtained by adding "1" to the selection signals ABC exceeds the upper limit of the selection signals ABC, the phase determining section 87 outputs the selection signal SEL_CLK to the selector 632 again. Then, step S801 is executed again.

The operation performed by the parallel data determining section 89 of the second exemplary embodiment is the same as that of the first exemplary embodiment.

Third Exemplary Embodiment

In the third exemplary embodiment, circuit components within a semiconductor integrated circuit are divided into plural blocks, and each of the divided blocks is synchronized with the same reference signal. It is now assumed that the plural blocks are constituted by a first block and a second block and that the second block is disposed subsequent to the first block. At a data connecting portion for connecting the first block and the second block, a switching unit for switching between normal parallel data (hereinafter referred to as "normal data") and parallel data used for adjusting the phase (hereinafter referred to as "adjusting data") is provided at an input section of a flip-flop disposed at the output stage of the first block. The normal data represents the result of data processing performed by the first block. Additionally, the second block is provided with a delay unit for delaying a reference signal and a first adjusting unit for detecting a phase shift of parallel data input from the first block (hereinafter also referred to as "input data"). The first adjusting unit detects a phase shift of input data with reference to a reference signal delayed for a certain amount and then adjusts the phase of the input data. If correct parallel data has not been extracted from the adjusted input data, the first adjusting unit changes the amount by which the reference signal is delayed, and then adjusts the phase of the input data on the basis of the changed reference signal. The second block is also provided with a second adjusting unit for performing adjustment so that parallel data received as a result of performing data processing (hereinafter referred to as "received data") by the second block will match the adjusting data output from the first block.

Figure 13:
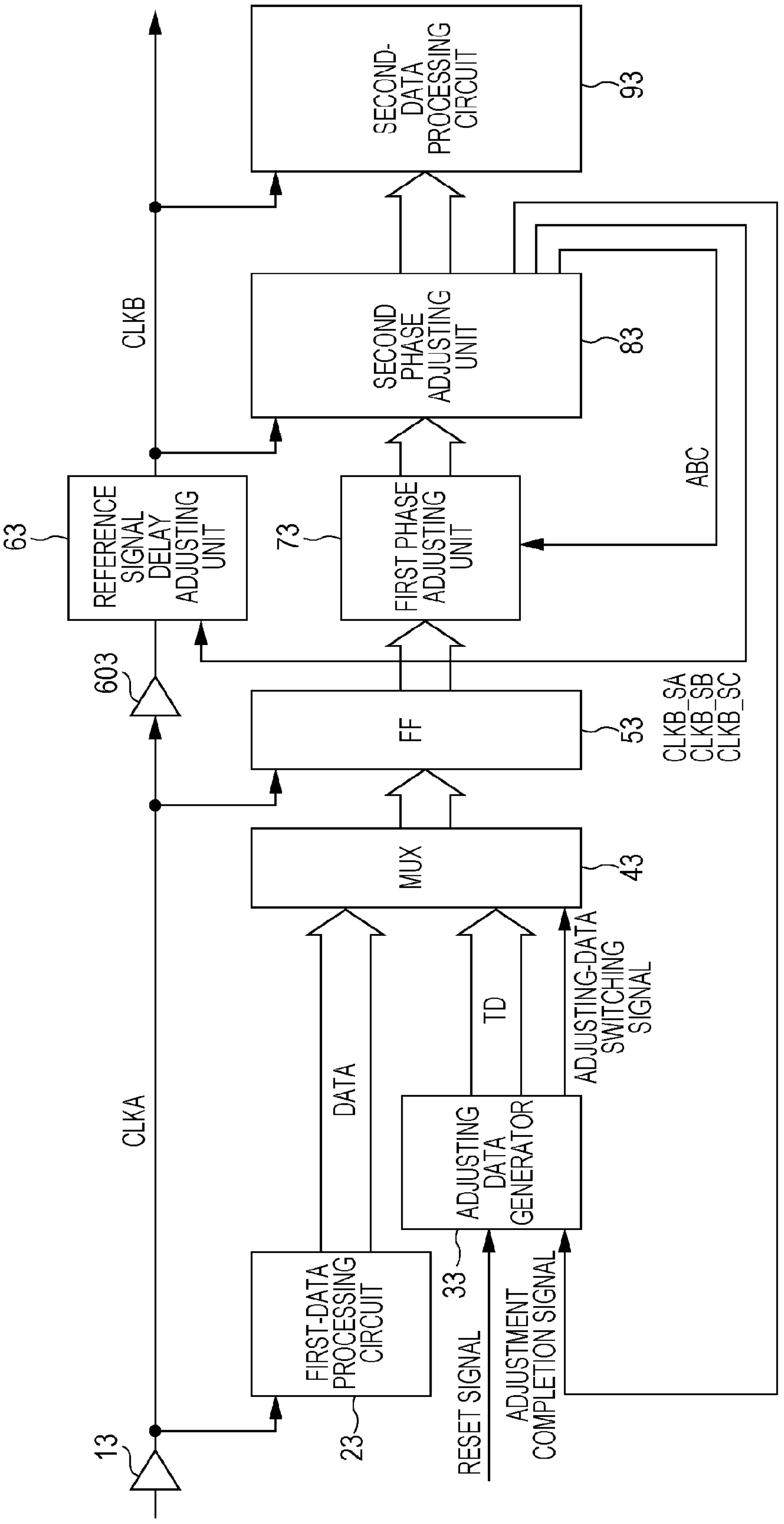
FIG. 13 is a block diagram illustrating an example of the configuration of a data processing circuit according to a third exemplary embodiment.

FIG. 13 is a block diagram illustrating an example of the configuration of a data processing circuit according to the third exemplary embodiment.

The data processing circuit is constituted by a first block and a second block, which is disposed subsequent to the first block. The first block is synchronized with a reference signal CLKA, which is an example of a first reference signal, delayed in a delay circuit 13. The second block is synchronized with a reference signal CLKB, which is an example of a second reference signal, separated from the reference signal CLKA. As shown in FIG. 13, the data processing circuit includes, as the first block, a first-data processing circuit 23, an adjusting data generator 33, a MUX 43, and a FF 53. The data processing circuit includes, as the second block, a first phase adjusting unit 73, a second phase adjusting unit 83, and a second-data processing circuit 93. The major difference between the third exemplary embodiment and the first exemplary embodiment is the following point. A reference signal separated from the reference signal CLKA by using a delay circuit 603 is delayed by specifying a certain amount of delay by using a reference signal delay adjusting unit 63, thereby generating the reference signal CLKB. In the third exemplary embodiment, the reference signal delay adjusting unit 63 is provided as an example of a generating circuit.

The first-data processing circuit 23, the adjusting data generator 33, the MUX 43, and the FF 53 are the same as the first-data processing circuit 21, the adjusting data generator 31, the MUX 41, and the FF 51, respectively, of the first exemplary embodiment, and an explanation thereof will thus be omitted.

The first phase adjusting unit 73 is different from the first phase adjusting unit 71 in that it is operated, not in accordance with a single reference signal, but in accordance with one of plural reference signals generated as a result of specifying different amounts of delay by using the reference signal delay adjusting unit 63. However, the basic configuration and operation of the first phase adjusting unit 73 is the same as that of the first phase adjusting unit 71.

The second phase adjusting unit 83 is also different from the first phase adjusting unit 81 in that it is operated, not in accordance with a single reference signal, but in accordance with one of plural reference signals generated as a result of specifying different amounts of delay by using the reference signal delay adjusting unit 63. However, the basic configuration and operation of the second phase adjusting unit 83 is the same as that of the second phase adjusting unit 81. More specifically, the second phase adjusting unit 83 also includes phase detectors $\mathbf{84}_0$, $\mathbf{84}_1$, . . . , $\mathbf{84}_{31}$, and a parallel data determining section 89. The phase detector $\mathbf{84}_0$, for example, includes a FF $\mathbf{841}_0$, an exclusive-OR logic circuit (EOR) $\mathbf{842}_0$, an inverter $\mathbf{843}_0$, a pattern detector $\mathbf{85}_0$, a counter $\mathbf{86}_0$, a phase determining section $\mathbf{87}_0$, and a timer $\mathbf{88}_0$. The functions of the elements forming the second phase adjusting unit 83 are basically the same as those of the second phase adjusting unit 81. However, the phase determining section $\mathbf{87}_0$ of the second phase adjusting unit 83 differs from that of the second phase adjusting unit 81 in that it outputs selection signals CLKB_SA, CLKB_SB, and CLKB_SC for specifying an amount by which the reference signal is delayed to the reference signal delay adjusting unit 63 if the setting of the phase of the input data has failed.

The internal configuration of the reference signal delay adjusting unit 63 will be described below in detail with reference to the block diagram of FIG. 14.

Figure 14:
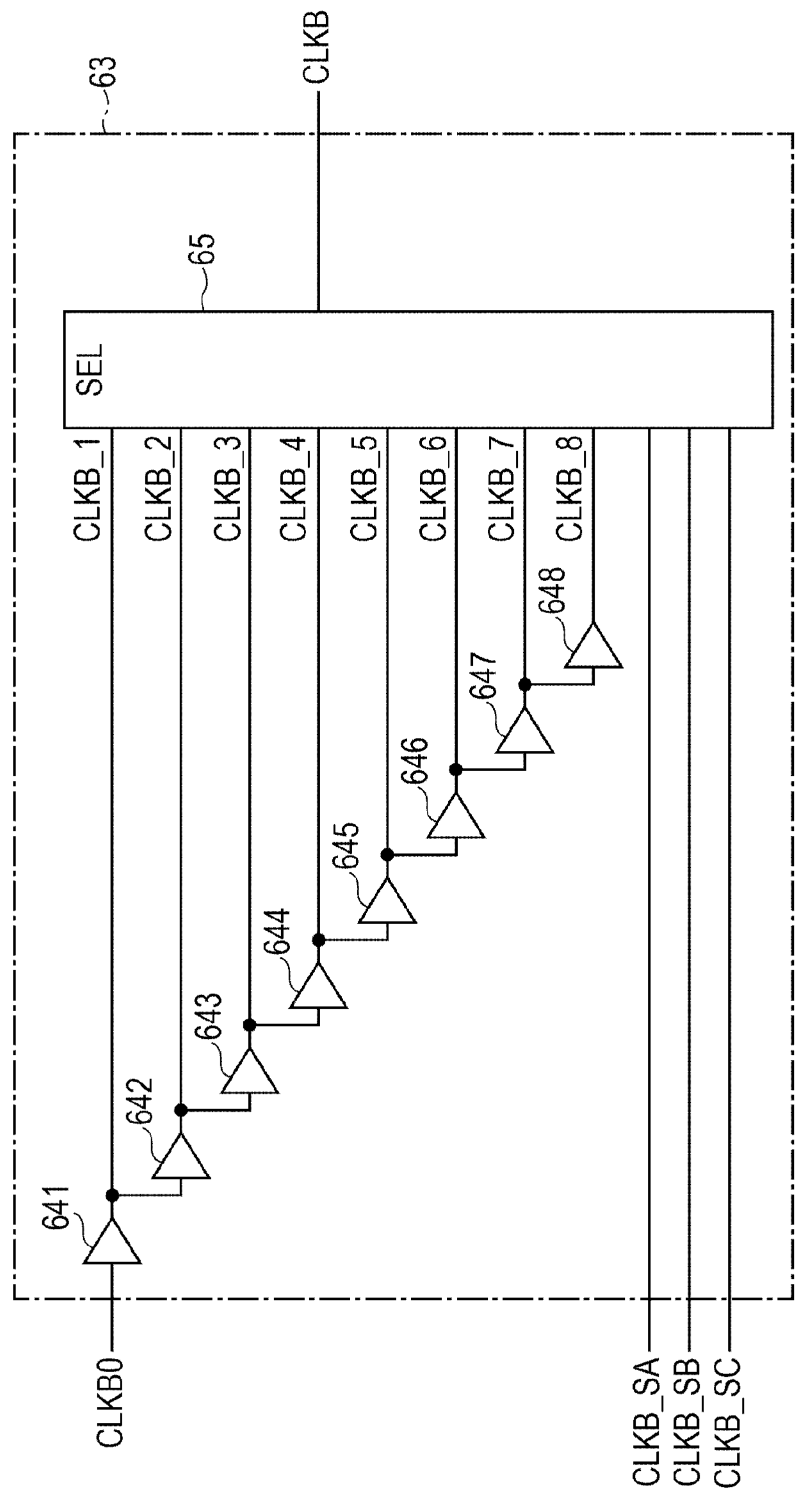
FIG. 14 is a block diagram illustrating an example of the internal configuration of a reference signal delay adjusting unit.

The reference signal delay adjusting unit 63 includes, as shown in FIG. 14, delay circuits 641, 642, . . . , 648 and a selector 65.

The delay circuit 641 delays the reference signal CLKB0 received from the delay circuit 603 and sets the delayed reference signal as CLKB_1, and the delay circuit 642 further delays CLKB_1, which has been delayed in the delay circuit 641, and sets the delayed reference signal as CLKB_2. Thereafter, the delay circuits 643 through 647 sequentially delay the reference signal, and the delay circuit 648 further delays CLKB_7, which has been delayed in the delay circuit 647, and sets the delayed reference signal as CLKB_8. That is, the delay circuits 641, 642, . . . , 648 sequentially delay CLKB0 and thereby output CLKB_1, CLKB_2, . . . , CLKB_8, respectively.

The selector 65 selects one reference signal from among CLKB_1 through CLKB_8 output from the delay circuits 641 through 648, respectively, on the basis of selection signals CLKB_SA, CLKB_SB, and CLKB_SC, and outputs the selected reference signal as CLKB. In this case, a reference signal may be selected on the basis of CLKB_SA, CLKB_SB, and CLKB_SC in the following manner. First, CLKB_SA is set as the first bit of binary data from the right, CLKB_SB is set as the second bit of the binary data from the right, and CLKB_SC is set as the third bit of the binary data from the right. In this case, if the value of the resulting binary data is N, CLKB_(N+1) is selected.

Figure 15:
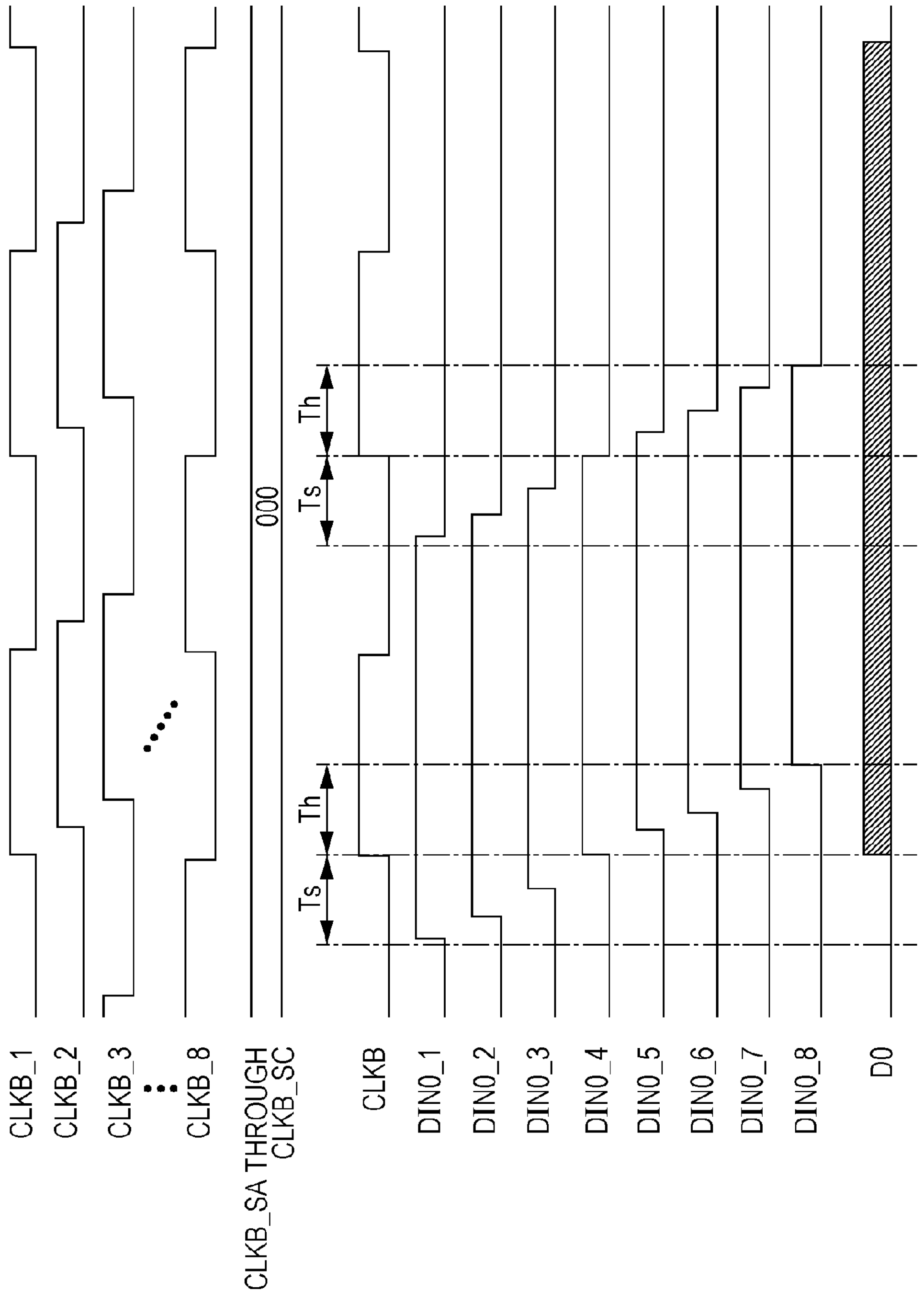
FIGS. 15 and 16 illustrate specific examples of a data phase adjustment operation performed by a first phase adjusting unit according to the third exemplary embodiment.
Figure 16:
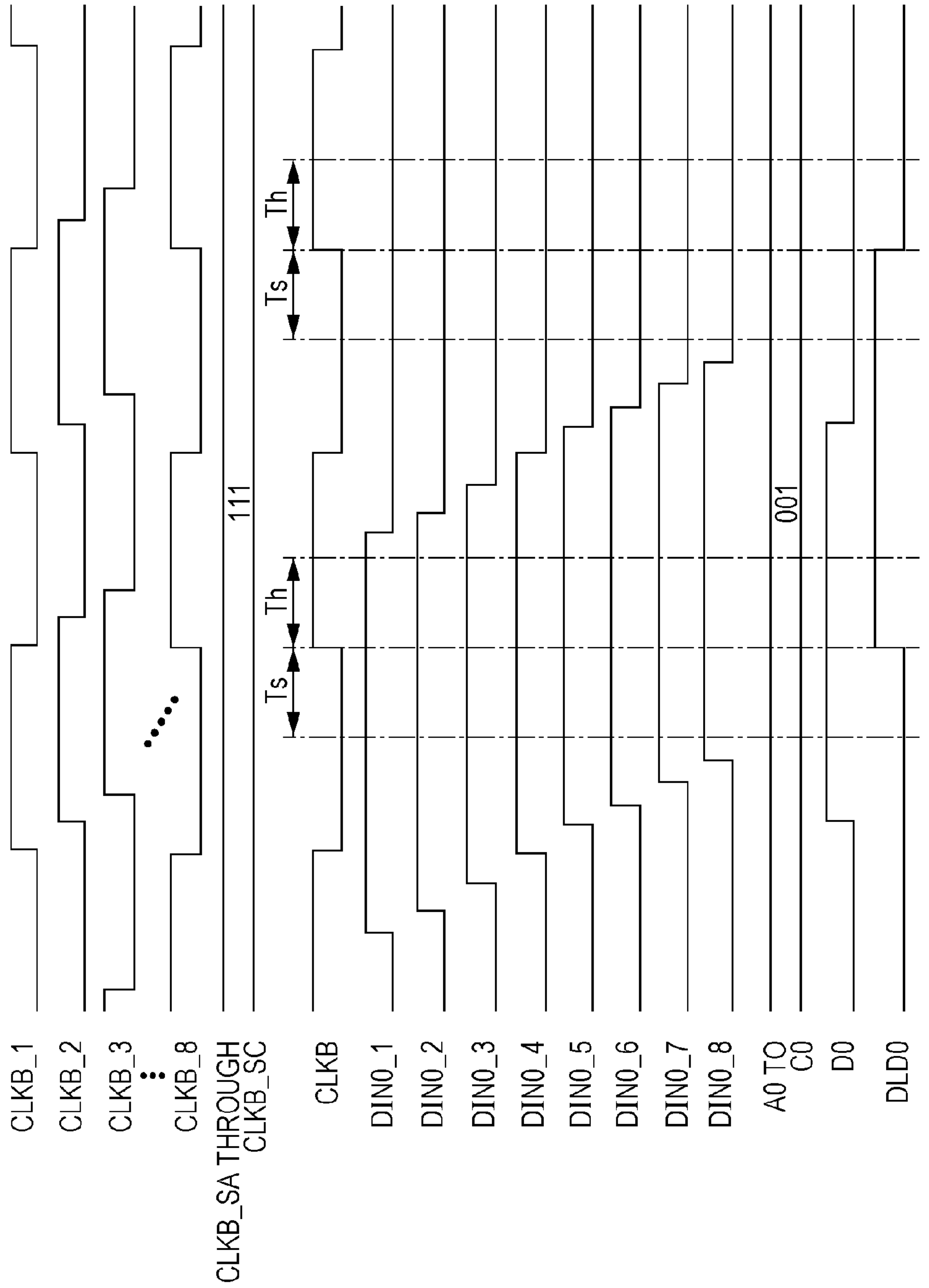

FIGS. 15 and 16 illustrate specific examples of a data phase adjustment operation performed by the first phase adjusting unit 73.

FIG. 15 illustrates an example of a case in which the selector 65 selects the reference signal CLKB_1 as the reference signal CLKB. That is, CLKB_SA, CLKB_SB, and CLKB_SC are set to be "0", "0", and "0", respectively. In FIG. 15, the hatched portion indicates that the value is undefined.

In this example, as shown in FIG. 15, in DIN0_1, . . . , DIN0_8, the values are changed during the setup time Ts or the hold time Th of the reference signal CLKB. Accordingly, data is not stably extracted from these items of data, as indicated by the row D0.

In contrast, FIG. 16 illustrates an example of a case in which the selector 65 selects the reference signal CLKB_8 as the reference signal CLKB. That is, CLKB_SA, CLKB_SB, and CLKB_SC are set to be "1", "1", and "1", respectively.

In this example, as shown in FIG. 16, in DIN0_1, . . . , DIN0_8, the values are not changed during the setup time Ts or the hold time Th of the reference signal CLKB. Accordingly, data is stably extracted from these items of data.

Thus, "0", "0", "1", for example, are set in A0, B0, and C0, respectively, and DIN0_5 is selected as D0, thereby making it possible to stably extract data from D0. In FIG. 16, DLD0, which is obtained by stably extracting data from D0 by using the second phase adjusting unit 83, is also shown.

In the third exemplary embodiment, a phase detection operation is performed by the phase detector $\mathbf{84}_0$, as shown in FIGS. 5 through 7, as in the first exemplary embodiment, and an explanation thereof will thus be omitted.

The operation performed by the phase determining section 87 of the third exemplary embodiment is merely slightly different from that of the first exemplary embodiment. That is, in step S807, if the value obtained by adding "1" to the selection signals ABC exceeds the upper limit of the selection signals ABC, the phase determining section 87 outputs one of the selection signals CLKB_SA through CLKB_SC to the reference signal delay adjusting unit 63. More specifically, if the selection signal CLKB_SA has been output, the phase determining section 87 outputs the selection signal CLKB_SB. If the selection signal CLKB_SB has been output, the phase determining section 87 outputs the selection signal CLKB_SC. Then, step S801 is executed again.

The operation performed by the parallel data determining section 89 of the third exemplary embodiment is the same as that of the first exemplary embodiment.

In the first through third exemplary embodiments, circuit components within a semiconductor integrated circuit are divided into plural blocks, each block being an example of a circuit section, and among the plural blocks, a description has been given by focusing on a first block and a second block. However, the plural blocks may include plural pairs of such first and second blocks.

In the first through third exemplary embodiments, a general data processing circuit has been discussed. In this case, the data processing circuit has the function of increasing the speed of image processing performed by an image processing apparatus. Accordingly, the data processing circuit may serve as a data processing circuit used in an image processing apparatus. Examples of the image processing apparatus are a printing apparatus, a scanner apparatus, a copying machine, a facsimile machine, etc. In this case, the first-data processing circuits 21, 22, and 23 are examples of a first image processing circuit, normal data is an example of a first image processing signal, the second-data processing circuits 91, 92, and 93 are examples of a second image processing circuit, and received data is an example of a second image processing signal.

A program implementing the exemplary embodiments of the invention may be provided by using a communication medium, or may be provided by storing the program in a recording medium, such as a compact disc read only memory (CD-ROM).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:

a first transfer circuit that is disposed subsequent to a first image processing circuit and that transfers a first image processing signal in accordance with a first reference signal, the first image processing signal being a parallel signal output from the first image processing circuit, the first image processing circuit performing first image processing in accordance with the first reference signal; and a second transfer circuit that is disposed prior to a second image processing circuit and that transfers a second image processing signal to the second image processing circuit, the second image processing signal being a parallel signal extracted from the first image processing signal output from the first transfer circuit in accordance with a second reference signal, the second reference signal being separated from the first reference signal, the second image processing circuit performing second image processing in accordance with the second reference signal, the first transfer circuit including a transmission circuit that transmits, instead of the first image processing signal output from the first image processing circuit, an adjusting signal to the second transfer circuit in accordance with the first reference signal, the adjusting signal being a parallel signal for adjusting a phase shift of the first image processing signal, the second transfer circuit including a first adjusting circuit that adjusts a phase of the adjusting signal transmitted from the transmission circuit so that the second image processing signal will be stably extracted from the adjusting signal in accordance with the second reference signal, and a second adjusting circuit that adjusts the phase of the adjusting signal transmitted from the transmission circuit so that the second image processing signal extracted from a signal obtained as a result of adjusting the phase of the adjusting signal by using the first adjusting circuit will match the adjusting signal transmitted from the transmission circuit.

2. A signal transfer circuit comprising:

a first transfer circuit that is disposed subsequent to a first processing circuit and that transfers an output signal in accordance with a first reference signal, the output signal being a parallel signal output from the first processing circuit, the first processing circuit performing first processing in accordance with the first reference signal; and a second transfer circuit that is disposed prior to a second processing circuit and that transfers a received signal to the second processing circuit, the received signal being a parallel signal extracted from the output signal output from the first transfer circuit in accordance with a second reference signal, the second reference signal being separated from the first reference signal, the second processing circuit performing second processing in accordance with the second reference signal, the first transfer circuit including a transmission circuit that transmits, instead of the output signal output from the first processing circuit, an adjusting signal to the second transfer circuit in accordance with the first reference signal, the adjusting signal being a parallel signal for adjusting a phase shift of the output signal, the second transfer circuit including a first adjusting circuit that adjusts a phase of the adjusting signal transmitted from the transmission circuit so that the received signal will be stably extracted from the adjusting signal in accordance with the second reference signal, and a second adjusting circuit that adjusts the phase of the adjusting signal transmitted from the transmission circuit so that the received signal extracted from a signal obtained as a result of adjusting the phase of the adjusting signal by using the first adjusting circuit will match the adjusting signal transmitted from the transmission circuit.

3. The signal transfer circuit according to claim 2, further comprising:

a selection circuit that selects, as the second reference signal, a specific reference signal from among a plurality of reference signals having different phases separated from the first reference signal, wherein the first adjusting circuit attempts to adjust the phase of the adjusting signal transmitted from the transmission circuit so that the received signal will be stably extracted from the adjusting signal in accordance with the specific reference signal selected by the selection circuit, and if the first adjusting circuit has failed to adjust the phase of the adjusting signal, the first adjusting circuit performs control such that the selection transmission circuit so that the received signal will be stably extracted from the adjusting signal in accordance with the different reference signal selected by the selection circuit.

4. The signal transfer circuit according to claim 2, further comprising:

a generating circuit that generates, as the second reference signal, a specific reference signal by delaying a reference signal separated from the first reference signal by a specified amount of delay, wherein the first adjusting circuit attempts to adjust the phase of the adjusting signal transmitted from the transmission circuit so that the received signal will be stably extracted from the adjusting signal in accordance with the specific reference signal generated by the generating circuit, and if the first adjusting circuit has failed to adjust the phase of the adjusting signal, the first adjusting circuit performs control such that the generating circuit generates a different reference signal by delaying the reference signal separated from the first reference signal by an amount of delay different from the specified amount of delay, and reattempts to adjust the phase of the adjusting signal transmitted from the transmission circuit so that the received signal will be stably extracted from the adjusting signal in accordance with the different reference signal.

5. The signal transfer circuit according to claim 2, further comprising:

a switching circuit that switches a parallel signal to be transmitted from the transmission circuit to the second transfer circuit to one of the output signal and the adjusting signal.

6. The signal transfer circuit according to claim 5, wherein, upon completing adjustment of the phase of the adjusting signal, the second adjusting circuit outputs information indicating the completion of adjustment of the phase of the adjusting signal to an external source or stores the information in a storage device that is readable from the external source.

7. The signal transfer circuit according to claim 5, further comprising:

a selection circuit that selects, as the second reference signal, a specific reference signal from among a plurality of reference signals having different phases separated from the first reference signal, wherein the first adjusting circuit attempts to adjust the phase of the adjusting signal transmitted from the transmission circuit so that the received signal will be stably extracted from the adjusting signal in accordance with the specific reference signal selected by the selection circuit, and if the first adjusting circuit has failed to adjust the phase of the adjusting signal, the first adjusting circuit performs control such that the selection circuit selects a different reference signal from among the plurality of reference signals, and reattempts to adjust the phase of the adjusting signal transmitted from the transmission circuit so that the received signal will be stably extracted from the adjusting signal in accordance with the different reference signal selected by the circuit selects a different reference signal from among the plurality of reference signals, and reattemps to adjust the phase of the adjusting signal transmitted from the selection circuit.

8. The signal transfer circuit according to claim 5, further comprising:

a generating circuit that generates, as the second reference signal, a specific reference signal by delaying a reference signal separated from the first reference signal by a specified amount of delay, wherein the first adjusting circuit attempts to adjust the phase of the adjusting signal transmitted from the transmission circuit so that the received signal will be stably extracted from the adjusting signal in accordance with the specific reference signal generated by the generating circuit, and if the first adjusting circuit has failed to adjust the phase of the adjusting signal, the first adjusting circuit performs control such that the generating circuit generates a different reference signal by delaying the reference signal separated from the first reference signal by an amount of delay different from the specified amount of delay, and reattempts to adjust the phase of the adjusting signal transmitted from the transmission circuit so that the received signal will be stably extracted from the adjusting signal in accordance with the different reference signal.

9. The signal transfer circuit according to claim 5, wherein, when the signal transfer circuit is powered ON or is reset, the switching circuit sets a parallel signal to be transmitted from the transmission circuit to the second transfer circuit to be the adjusting signal, and upon completing adjustment of the phase of the adjusting signal by the second adjusting circuit, the switching circuit switches the parallel signal from the adjusting signal to the output signal.

10. The signal transfer circuit according to claim 9, wherein, upon completing adjustment of the phase of the adjusting signal, the second adjusting circuit outputs information indicating the completion of adjustment of the phase of the adjusting signal to an external source or stores the information in a storage device that is readable from the external source.

11. The signal transfer circuit according to claim 9, further comprising:

a selection circuit that selects, as the second reference signal, a specific reference signal from among a plurality of reference signals having different phases separated from the first reference signal, wherein the first adjusting circuit attempts to adjust the phase of the adjusting signal transmitted from the transmission circuit so that the received signal will be stably extracted from the adjusting signal in accordance with the specific reference signal selected by the selection circuit, and if the first adjusting circuit has failed to adjust the phase of the adjusting signal, the first adjusting circuit performs control such that the selection circuit selects a different reference signal from among the plurality of reference signals, and reattempts to adjust the phase of the adjusting signal transmitted from the transmission circuit so that the received signal will be stably extracted from the adjusting signal in accordance with the different reference signal selected by the circuit selects a different reference signal from among the plurality of reference signals, and reattemps to adjust the phase of the adjusting signal transmitted from the transmission circuit so that the received signal will be. stably extracted from the adjusting signal in accordance with the different reference signal selected by the selection circuit.

12. The signal transfer circuit according to claim 9, further comprising:

a generating circuit that generates, as the second reference signal, a specific reference signal by delaying a reference signal separated from the first reference signal by a specified amount of delay, wherein the first adjusting circuit attempts to adjust the phase of the adjusting signal transmitted from the transmission circuit so that the received signal will be stably extracted from the adjusting signal in accordance with the specific reference signal generated by the generating circuit, and if the first adjusting circuit has failed to adjust the phase of the adjusting signal, the first adjusting circuit performs control such that the generating circuit generates a different reference signal by delaying the reference signal separated from the first reference signal by an amount of delay different from the specified amount of delay, and reattempts to adjust the phase of the adjusting signal transmitted from the transmission circuit so that the received signal will be stably extracted from the adjusting signal in accordance with the different reference signal.

13. The signal transfer circuit according to claim 9, wherein, when switching the parallel signal from the adjusting signal to the output signal, the switching circuit outputs information indicating that the parallel signal has been switched to the output signal to an external source or stores the information in a storage device that is readable from the external source.

14. The signal transfer circuit according to claim 13, wherein, upon completing adjustment of the phase of the adjusting signal, the second adjusting circuit outputs information indicating the completion of adjustment of the phase of the adjusting signal to an external source or stores the information in a storage device that is readable from the external source.

15. The signal transfer circuit according to claim 13, further comprising:

a selection circuit that selects, as the second reference signal, a specific reference signal from among a plurality of reference signals having different phases separated from the first reference signal, wherein the first adjusting circuit attempts to adjust the phase of the adjusting signal transmitted from the transmission circuit so that the received signal will be stably extracted from the adjusting signal in accordance with the specific reference signal selected by the selection circuit, and if the first adjusting circuit has failed to adjust the phase of the adjusting signal, the first adjusting circuit performs control such that the selection circuit selects a different reference signal from among the plurality of reference signals, and reattempts to adjust the phase of the adjusting signal transmitted from the transmission circuit so that the received signal will be stably extracted from the adjusting signal in accordance with the different reference signal selected by the selection circuit.

16. The signal transfer circuit according to claim 13, further comprising:

a generating circuit that generates, as the second reference signal, a specific reference signal by delaying a reference signal separated from the first reference signal by a specified amount of delay, wherein the first adjusting circuit attempts to adjust the phase of the adjusting signal transmitted from the transmission circuit so that the received signal will be stably extracted from the adjusting signal in accordance with the specific reference signal generated by the generating circuit, and if the first adjusting circuit has failed to adjust the phase of the adjusting signal, the first adjusting circuit performs control such that the generating circuit generates a different reference signal by delaying the reference signal separated from the first reference signal by an amount of delay different from the specified amount of delay, and reattempts to adjust the phase of the adjusting signal transmitted from the transmission circuit so that the received signal will be stably extracted from the adjusting signal in accordance with the different reference signal.

17. The signal transfer circuit according to claim 2, wherein, upon completing adjustment of the phase of the adjusting signal, the second adjusting circuit outputs information indicating the completion of adjustment of the phase of the adjusting signal to an external source or stores the information in a storage device that is readable from the external source.

18. The signal transfer circuit according to claim 17, further comprising:

a selection circuit that selects, as the second reference signal, a specific reference signal from among a plurality of reference signals having different phases separated from the first reference signal, wherein the first adjusting circuit attempts to adjust the phase of the adjusting signal transmitted from the transmission circuit so that the received signal will be stably extracted from the adjusting signal in accordance with the specific reference signal selected by the selection circuit, and if the first adjusting circuit has failed to adjust the phase of the adjusting signal, the first adjusting circuit performs control such that the selection circuit selects a different reference signal from among the plurality of reference signals, and reattempts to adjust the phase of the adjusting signal transmitted from the transmission circuit so that the received signal will be stably extracted from the adjusting signal in accordance with the different reference signal selected by the selection circuit.

19. The signal transfer circuit according to claim 17, further comprising:

a generating circuit that generates, as the second reference signal, a specific reference signal by delaying a reference signal separated from the first reference signal by a specified amount of delay, wherein the first adjusting circuit attempts to adjust the phase of the adjusting signal transmitted from the transmission circuit so that the received signal will be stably extracted from the adjusting signal in accordance with the specific reference signal generated by the generating circuit, and if the first adjusting circuit has failed to adjust the phase of the adjusting signal, the first adjusting circuit performs control such that the generating circuit generates a different reference signal by delaying the reference signal separated from the first reference signal by an amount of delay different from the specified amount of delay, and reattempts to adjust the phase of the adjusting signal transmitted from the transmission circuit so that the received signal will be stably extracted from the adjusting signal in accordance with the different reference signal.

20. A semiconductor integrated circuit comprising:

a plurality of circuit sections, each of the plurality of circuit sections including a first processing circuit that performs first processing in accordance with a first reference signal, a second processing circuit that performs second processing in accordance with a second reference signal separated from the first reference signal, a first transfer circuit that is disposed subsequent to the first processing circuit and that transfers an output signal in accordance with the first reference signal, the output signal being a parallel signal output from the first processing circuit, and a second transfer circuit that is disposed prior to the second processing circuit and that transfers a received signal to the second processing circuit, the received signal being a parallel signal extracted from the output signal output from the first transfer circuit in accordance with the second reference signal, the first transfer circuit including a transmission circuit that transmits, instead of the output signal output from the first processing circuit, an adjusting signal to the second transfer circuit in accordance with the first reference signal, the adjusting signal being a parallel signal for adjusting a phase shift of the output signal, the second transfer circuit including a first adjusting circuit that adjusts a phase of the adjusting signal transmitted from the transmission circuit so that the received signal will be stably extracted from the adjusting signal in accordance with the second reference signal, and a second adjusting circuit that adjusts the phase of the adjusting signal transmitted from the transmission circuit so that the received signal extracted from a signal obtained as a result of adjusting the phase of the adjusting signal by using the first adjusting circuit will match the adjusting signal transmitted from the transmission circuit.

* * * * *